(12) United States Patent
Patel et al.

(10) Patent No.: US 10,085,255 B2
(45) Date of Patent: Sep. 25, 2018

(54) PHYSICAL UPLINK CONTROL CHANNEL FOR LOW LATENCY DOWNLINK COMMUNICATIONS

(71) Applicant: QUALCOMM Incorporated, San Diego, CA (US)

(72) Inventors: Shimman Arvind Patel, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 219 days.

(21) Appl. No.: 15/188,098

(22) Filed: Jun. 21, 2016

(65) Prior Publication Data

US 2017/0064706 A1     Mar. 2, 2017

Related U.S. Application Data

(60) Provisional application No. 62/213,563, filed on Sep. 2, 2015.

(51) Int. Cl.
*H04L 12/26* (2006.01)
*H04W 72/04* (2009.01)
(Continued)

(52) U.S. Cl.
CPC ....... *H04W 72/0446* (2013.01); *H04L 1/1614* (2013.01); *H04L 1/1825* (2013.01);
(Continued)

(58) Field of Classification Search
CPC .................................................. H04W 72/0446
See application file for complete search history.

(56) References Cited

U.S. PATENT DOCUMENTS 7,350,125 B2 *   3/2008   Jang .................. H04L 1/1819
                                                       714/748
7,539,917 B2 *   5/2009   Zhuyan ............. H04L 1/0071
                                                       714/749
(Continued)

OTHER PUBLICATIONS

Hewlett Packard, "Latency Evaluation for HSDPA/EDCH," 3GPP TSG RAN WG2 Meeting #56, R2-063126, Riga, Latvia, Nov. 6-10, 2006, 8 pgs., XP050602815, 3rd Generation Partnership Project.
(Continued)

*Primary Examiner* — Guang W Li
(74) *Attorney, Agent, or Firm* — Holland & Hart LLP

(57) ABSTRACT

Methods, systems, and devices for wireless communication are described. A wireless device may receive a data transmission during a transmission time interval (TTI) that has one duration, and the device may transmit a responsive control message (e.g., acknowledgment information) in a subsequent TTI that has a different duration (e.g., a greater duration). In some cases, the control message may include bundled acknowledgment information for multiple downlink transmissions. The control message may, for instance, include acknowledgment information for data received during several TTIs having one duration bundled with acknowledgment information for data received during TTIs that have a different duration. The acknowledgment information may be compressed using, for example, a starting point and run length of consecutive negative acknowledgments.

30 Claims, 19 Drawing Sheets

(51) Int. Cl.
*H04L 5/00* (2006.01)
*H04W 28/04* (2009.01)
*H04W 28/02* (2009.01)
*H04L 1/16* (2006.01)
*H04L 1/18* (2006.01)

(52) U.S. Cl.
CPC .......... *H04L 1/1861* (2013.01); *H04L 1/1896* (2013.01); *H04L 5/0055* (2013.01); *H04W 28/0236* (2013.01); *H04W 28/04* (2013.01); *H04W 72/042* (2013.01)

(56) References Cited

U.S. PATENT DOCUMENTS

| | | | | |
|---|---|---|---|---|
| 8,233,431 | B2* | 7/2012 | Pirskanen | H04L 1/0007 370/328 |
| 8,520,560 | B2* | 8/2013 | Papasakellariou | H04L 5/001 370/280 |
| 8,837,311 | B2* | 9/2014 | Martin | H04L 1/0001 370/252 |
| 8,942,127 | B2* | 1/2015 | Lu | H04W 24/00 370/252 |
| 9,112,662 | B2* | 8/2015 | Papasakellariou | H04L 5/0055 |
| 9,148,875 | B2* | 9/2015 | Holma | H04J 13/16 |
| 9,282,567 | B2* | 3/2016 | Golitschek Edler von Elbwart | H04B 7/2656 |
| 9,521,655 | B2* | 12/2016 | Kanamarlapudi | H04W 52/146 |
| 9,722,727 | B2* | 8/2017 | Andgart | H04L 1/0003 |
| 9,762,357 | B2* | 9/2017 | Maattanen | H04L 1/1671 |
| 9,801,175 | B2* | 10/2017 | Kuchibhotla | H04W 72/044 |
| 9,894,606 | B2* | 2/2018 | Nammi | H04W 52/0216 |
| 2005/0249120 | A1* | 11/2005 | Heo | H04L 1/0007 370/236 |
| 2006/0034285 | A1* | 2/2006 | Pirskanen | H04L 1/0007 370/394 |
| 2007/0150788 | A1* | 6/2007 | Zhuyan | H04L 1/0071 714/749 |
| 2008/0095110 | A1* | 4/2008 | Montojo | H04L 5/0053 370/330 |
| 2011/0305213 | A1* | 12/2011 | Lohr | H04L 1/1887 370/329 |
| 2012/0039294 | A1* | 2/2012 | Yan | H04W 36/06 370/329 |
| 2013/0208668 | A1* | 8/2013 | Ramos | H04W 76/36 370/329 |
| 2013/0329701 | A1* | 12/2013 | Bajzec | H04L 1/1887 370/336 |
| 2014/0056237 | A1* | 2/2014 | Eriksson | H04L 1/0006 370/329 |
| 2014/0078982 | A1* | 3/2014 | Nammi | H04B 7/0473 370/329 |
| 2014/0177545 | A1* | 6/2014 | Nammi | H04W 72/1226 370/329 |
| 2014/0334462 | A1* | 11/2014 | Pradas | H04W 72/00 370/336 |
| 2015/0098438 | A1* | 4/2015 | Nammi | H04W 24/10 370/330 |
| 2015/0215082 | A1* | 7/2015 | Agiwal | H04L 1/1822 370/336 |
| 2015/0289243 | A1* | 10/2015 | Shi | H04W 28/16 370/336 |
| 2016/0261321 | A1* | 9/2016 | Andgart | H04B 7/0456 |
| 2016/0269164 | A1* | 9/2016 | Jiang | H04L 5/0055 |
| 2016/0353436 | A1* | 12/2016 | Au | H04L 5/0007 |
| 2017/0290008 | A1* | 10/2017 | Tooher | H04W 72/0446 |

OTHER PUBLICATIONS

ISA/EP, International Search Report and Written Opinion of the International Searching Authority, Int'l Application No. PCT/US2016/044276, dated Oct. 12, 2016, European Patent Office, Rijswijk, NL, 12 pgs.

Qualcomm, "Comparison of TDM and CDM ACKCH Performance", 3GPP TSG-RAN WG1 Meeting #34, Tdoc R1-03-1011, Seoul, Korea, Oct. 6-10, 2003, 7 pgs., 3rd Generation Partnership Project.

Samsung, "HARQ Operation at TTI Reconfiguration," 3GPP TSG-RAN2 Meeting #46, R2-050350, Scottsdale, Arizona, Feb. 14-18, 2005, 4 pgs., XP050127612, 3rd Generation Partnership Project.

* cited by examiner

PHYSICAL UPLINK CONTROL CHANNEL FOR LOW LATENCY DOWNLINK COMMUNICATIONS

CROSS REFERENCES

The present application for patent claims priority to U.S. Provisional Patent Application No. 62/213,563 by Patel, et al., entitled "PHYSICAL UPLINK CONTROL CHANNEL FOR LOW LATENCY DOWNLINK COMMUNICATIONS," filed Sep. 2, 2015, assigned to the assignee hereof.

BACKGROUND

The following relates generally to wireless communication, and more specifically to physical uplink control channel (PUCCH) for low latency downlink communication.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

A UE and a base station may communicate using a low latency physical layer (PHY) configuration, which may include using transmission time intervals (TTIs) that have a shorter duration relative to other TTIs used in the system. These low latency communications may be more sensitive to channel conditions than communications using longer duration TTIs. Thus, some low latency messages, such as control channel messages including acknowledgment information, may be lost, which may result in delays and disruptions in communication between the UE and base station.

SUMMARY

A wireless device may receive a data transmission during a transmission time interval (TTI) that has one duration, and the device may transmit a control message with acknowledgment information for the data transmission in a subsequent TTI, which may have a longer duration relative to the TTI during which the data was received. In some cases, the control message may include bundled acknowledgment information for multiple downlink transmissions. For example, the control message may include acknowledgment information for data received during several TTIs having one duration bundled with acknowledgment information for data received during TTIs that have a different, greater duration. The acknowledgment information may be compressed using an indication of a starting point (e.g., a TTI index) and run length of consecutive negative acknowledgments, which may allow more efficient use of various control message formats.

A method of wireless communication is described. The method may include receiving a data transmission during a first transmission time interval (TTI) that has a first duration, and transmitting a control message during a second TTI that has a second duration greater than the first duration, wherein the control message includes acknowledgement information for the data transmission.

An apparatus for wireless communication is described. The apparatus may include means for receiving a data transmission during a first TTI that has a first duration, and means for transmitting a control message during a second TTI that has a second duration greater than the first duration, wherein the control message includes acknowledgment information for the data transmission.

Another apparatus for wireless communication is described. The apparatus may include a processor, memory in electronic communication with the processor, and instructions stored in the memory. The instructions may be operable, when executed by the processor, to cause the apparatus to receive a data transmission during a first TTI that has a first duration, and transmit a control message during a second TTI that has a second duration greater than the first duration, wherein the control message includes acknowledgment information for the data transmission.

A non-transitory computer-readable medium for wireless communication is described. The non-transitory computer-readable medium may include instructions to receive a data transmission during a first TTI that has a first duration, and transmit a control message during a second TTI that has a second duration greater than the first duration, where the control message includes acknowledgment information for the data transmission.

Some examples of the method, apparatuses, or non-transitory computer-readable medium described above may include operations, features, means, or instructions for receiving an additional data transmission during a third TTI, and the control message may include acknowledgment information for the additional data transmission. In some examples of the method, apparatuses, or non-transitory computer-readable medium described above, the third TTI may have the second TTI duration.

In some examples of the method, apparatuses, or non-transitory computer-readable medium described above, a bit of the control message may correspond to the acknowledgment information for the data transmission and the acknowledgment information for the additional data transmission.

In some examples of the method, apparatuses, or non-transitory computer-readable medium described above, the control message may include a first field that corresponds to data transmissions during TTIs with the first duration and a second field that corresponds to data transmission during TTIs with the second duration.

Some examples of the method, apparatuses, or non-transitory computer-readable medium described above may include operations, features, means, or instructions for identifying a first number of bits for the first field and second number of bits for the second field, where a sum of the first number of bits and the second number of bits equals a total number of bits available for the acknowledgment information in the control message.

Some examples of the method, apparatus, or non-transitory computer-readable medium described above may include operations, features, means, or instructions for receiving a set of data transmissions, where each data transmission of the set is received during a TTI with the first duration. Some examples of the method, apparatuses, or non-transitory computer-readable medium described above may include operations, features, means, or instructions for identifying a number of bits available for the acknowledgment information in the control message, where the number of bits is less than a number of the set of data transmissions.

Some examples of the method, apparatuses, or non-transitory computer-readable medium described above may include operations, features, means, or instructions for identifying a sequence including a decoding indicator for each data transmission of the set of data transmissions, where the sequence includes a sub-sequence of decoding failure indicators. Some examples of the method, apparatuses, or non-transitory computer-readable medium described above may include operations, features, means, or instructions for compressing the sequence based on a starting index of the sub-sequence and a run length of the sub-sequence.

In some examples of the method, apparatuses, or non-transitory computer-readable medium described above, the control message may include an indicator of the starting index of the sub-sequence and an indicator of the run length of the subsequence.

In some examples of the method, apparatuses, or non-transitory computer-readable medium described above, the control message may include an indicator of the run length of the subsequence, and the starting index of the sub-sequence may correspond to a location of a downlink (DL) control message.

In some examples of the method, apparatuses, or non-transitory computer-readable medium described above, each bit of the control message may correspond to a unique hybrid automatic repeat request (HARQ) process.

Some examples of the method, apparatuses, or non-transitory computer-readable medium described above may include operations, features, means, or instructions for receiving a DL control message during a third TTI that has the first TTI duration. Some examples of the method, apparatuses, or non-transitory computer-readable medium described above may include operations, features, means, or instructions for identifying the second TTI for transmission of the control message based on the DL control message.

Some examples of the method, apparatuses, or non-transitory computer-readable medium described above may include operations, features, means, or instructions for identifying the second TTI for transmission of the control message based on a radio resource control (RRC) configuration.

Some examples of the method, apparatuses, or non-transitory computer-readable medium described above may further include operations, features, means, or instructions for identifying the second TTI for transmission of the control message based on a channel condition.

A method of wireless communication is described. The method may include transmitting data during a first TTI that has a first duration, and receiving a control message during a second TTI that has a second duration greater than the first duration, wherein the control message includes acknowledgment information for the data transmission.

An apparatus for wireless communication is described. The apparatus may include means for transmitting data during a first TTI that has a first duration, and means for receiving a control message during a second TTI that has a second duration greater than the first duration, wherein the control message includes acknowledgment information for the data transmission.

Another apparatus for wireless communication is described. The apparatus may include a processor, memory in electronic communication with the processor, and instructions stored in the memory. The instructions may be operable, when executed by the processor, to cause the apparatus to transmit data during a first TTI that has a first duration, and receive a control message during a second TTI that has a second duration greater than the first duration, wherein the control message includes acknowledgment information for the data transmission.

A non-transitory computer-readable medium for wireless communication is described. The non-transitory computer-readable medium may include instructions to transmit data during a first TTI that has a first duration, and receive a control message during a second TTI that has a second duration greater than the first duration, where the control message includes acknowledgment information for the data transmission.

Some examples of the method, apparatuses, or non-transitory computer-readable medium described above may include operations, features, means, or instructions for retransmitting the data during a third TTI that has the first TTI duration, and the retransmission may be based on the acknowledgment information.

Some examples of the method, apparatuses, or non-transitory computer-readable medium described above may include operations, features, means, or instructions for transmitting a DL control message during a third TTI that has the first TTI duration, and the second TTI may be identified for transmission of the control message based on the DL control message.

DETAILED DESCRIPTION

Figure 1:
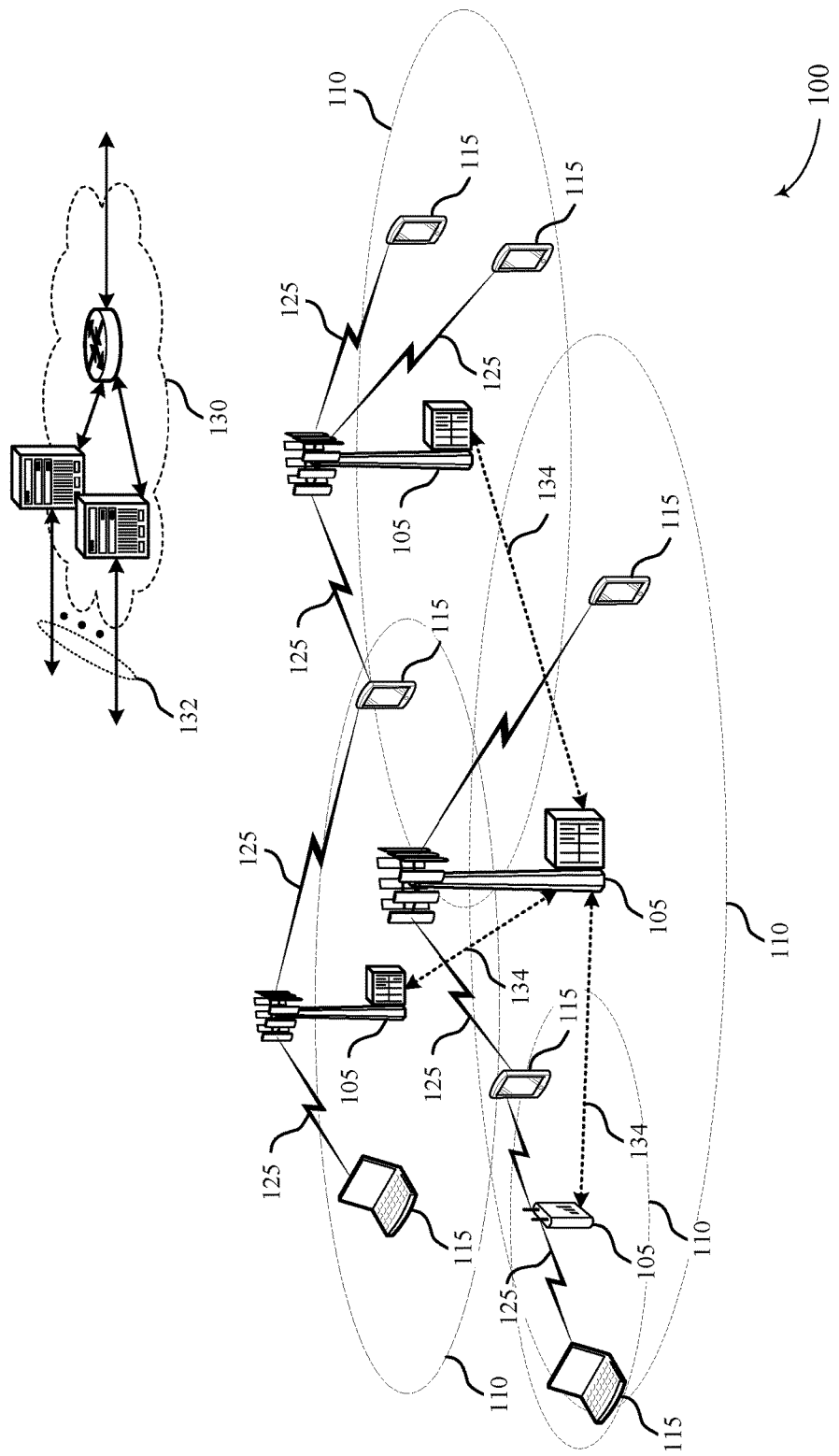
FIG. 1 illustrates an example of a wireless communications system that supports various physical uplink control channel (PUCCH) configurations associated with low latency downlink communications, in accordance with aspects of the present disclosure.

Some wireless systems may use transmission time intervals (TTIs) that have a shorter duration relative to other TTIs in order to decrease latency and to provide enhanced throughput and reduced packet acknowledgment response timing. These wireless systems may use various physical uplink control channel (PUCCH) configurations to communicate uplink control information (UCI) for downlink communications received during the relatively shorter TTIs. The UCI may include hybrid automatic repeat request (HARQ) information or scheduling requests, for instance. Also, communication that employs the relatively shorter duration TTIs may be referred to as low latency communication because communication using the shorter duration TTIs may decrease latency as compared with communication using TTIs of longer duration. In some cases, and as described in further detail below, low latency communication may use different numerology and timing, and in other cases the numerology and timing may be the same as communication during relatively longer TTIs (e.g., 15 kHz tone spacing and orthogonal symbol durations).

A wireless system that supports low latency communication may thus use or include a TTI of, for example, one symbol, two symbols, or one slot. A PUCCH, for example a PUCCH that occupies at least a portion of a one-subframe TTI, may be used to transmit control information for downlink low latency transmissions. This type of PUCCH may be referred to as non-low latency PUCCH, legacy PUCCH, or one subframe-based PUCCH in various examples. In some cases, a PUCCH that occupies some or all of a shorter duration TTI (e.g., one symbol, two symbols, one slot, etc.) may be used. This latter type of PUCCH may be referred to as a low latency PUCCH or uPUCCH. A user equipment (UE) may support operation using different PUCCH configurations, including uPUCCH, or PUCCH, or both uPUCCH and PUCCH. For example, UEs in poor channel conditions may utilize a one subframe-based PUCCH to provide HARQ feedback for downlink low latency transmissions (e.g., using one-symbol, two-symbols, or one-slot TTIs), and UEs in relatively better channel conditions may use low latency PUCCH.

In some case, a PUCCH message may have a format with a portion of the message payload designated for acknowledgment information (e.g., HARQ information such as an acknowledgment (ACK) or negative acknowledgment (NACK), as described herein). The payload may be split, with a portion designated for low latency communications. The split between low latency portions of the payload and other portions of the payload may be dynamic and may be based on factors such as a nominal HARQ payload size for a physical downlink shared channel (PDSCH) that occupies some or all of a relatively larger TTI, such as a 1 ms TTI. This type of PDSCH may be referred to as a non-low latency or legacy PDSCH in some examples.

A nominal payload for non-low latency PDSCH acknowledgment information (e.g., HARQ) may be based on one or several factors, including: a number of component carriers (CCs) configured for a UE, a downlink transmission mode for each CC, a duplexing configuration, a downlink or uplink subframe configuration, or the like. In some cases, the split of a payload between low latency acknowledgement information and non-low latency acknowledgment information may be configurable. A configurable split may provide flexibility for a base station in managing tradeoffs between HARQ for low latency and non-low latency data.

The use of PUCCH (e.g., legacy PUCCH) for low latency wireless systems may be semi-statically or dynamically triggered using downlink control channels or dedicated signaling, or both. As described further below, if the triggering is accomplished with a non-low latency control channel (e.g., a physical downlink control channel (PDCCH)) or with radio resource control (RRC) signaling, a window size for low latency transmissions bundled within a common PUCCH message may be aligned with subframe boundaries of radio frame that includes the low latency transmissions; and if the triggering is accomplished with a downlink control channel in a shorter-duration TTI (e.g., a low latency PDCCH, uPDCCH, etc.), the window size for low latency transmissions bundled within a common PUCCH may not be aligned with a subframe boundary.

Aspects of the disclosure introduced above are further described below in the context of a wireless communication system. Additional details and examples of the timing of and physical resource configurations, including PUCCH configurations, are also described. Aspects of the disclosure are further illustrated by and described with reference to apparatus diagrams, system diagrams, and flowcharts that relate to various PUCCH configurations associated with low latency downlink communication.

FIG. 1 illustrates an example of a wireless communications system 100 that supports various physical uplink control channel (PUCCH) configurations associated with low latency downlink communications, in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. Wireless communications system 100 may support low latency communication by using various durations of TTIs and may support various PUCCH configurations for providing uplink control information associated with low latency data transmissions.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. In some examples, communication links 125 include TTIs of a relatively shorter duration compared with other TTIs used in the system 100.

UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device or the like. Some of the UEs 115 support communication using shorter duration TTIs (e.g., one symbol, two symbols, one slot, etc.). These UEs 115 may be referred to as low latency UEs 115. Some UEs 115 may not support low latency communication and may operate according to earlier versions of a wireless communication standard (e.g., an earlier LTE/LTE-A release) than low latency UEs 115. These UEs 115 may be referred to as legacy UEs 115 or non-low latency UEs 115.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (evolved node B (eNB)s) 105.

Wireless communications system 100 may use a frame structure may be used to organize physical resources. A frame may be a 10 ms interval that may be further divided into 10 equally sized sub-frames. Each sub-frame may include two consecutive slots (e.g., time slots). Each slot may include 6 or 7 OFDMA symbol periods. A resource element consists of one symbol period and one subcarrier (a 15 KHz frequency range). A resource block may contain 12 consecutive subcarriers in the frequency domain and, for a normal cyclic prefix in each orthogonal frequency division multiplexed (OFDM) symbol, 7 consecutive OFDM symbols in the time domain (1 slot), or 84 resource elements. A TTI may be the basic unit of scheduling. In some cases, (e.g., for non-low latency communications), the TTI length may be one LTE subframe (e.g., 1 ms), and in other cases (e.g., for low latency communications) the TTI length may be one symbol period, two symbol periods, one slot, or the like. Low latency UEs 115 may communicate using both a shorter duration TTI length and a longer duration TTI length.

In some cases, wireless communications system 100 may utilize one enhanced component carrier (eCC), or more than one eCC. An eCC may be characterized by one or more features, including: flexible bandwidth, different TTIs, and modified control channel configuration. In some cases, an eCC may be associated with a CA configuration or a dual connectivity configuration (e.g., when multiple serving cells have a suboptimal backhaul link). An eCC may also be configured for use in unlicensed spectrum or shared spectrum (e.g., where more than one operator is licensed to use the spectrum, when one or more devices may perform a contention procedure to access a shared spectrum, etc.). An eCC characterized by flexible bandwidth may include one or more segments that may be utilized by UEs 115 that do not or are not capable of monitoring the whole bandwidth, or prefer to use a limited bandwidth (e.g., to conserve power). In some cases, an eCC may utilize a different TTI length than other CCs, which may include use of a reduced or variable symbol duration as compared with TTIs of the other CCs. The symbol duration may remain the same, in some cases, but each symbol may represent a distinct TTI.

In some examples, an eCC may include multiple hierarchical layers associated with the different TTI lengths. For example, TTIs at one hierarchical layer may correspond to uniform 1 ms subframes, whereas in a second layer, variable length TTIs may correspond to bursts of short duration symbol periods. In some cases, a shorter symbol duration may also be associated with increased subcarrier spacing. In conjunction with the reduced TTI length, an eCC may utilize dynamic time division duplex (TDD) operation (e.g., it may switch from DL to UL operation for short bursts according to dynamic conditions.). Flexible bandwidth and variable TTIs may be associated with a modified control channel configuration (e.g., an eCC may utilize an enhanced physical downlink control channel (ePDCCH) for DL control information). For example, one or more control channels of an eCC may utilize frequency division multiplexing (FDM) scheduling to accommodate flexible bandwidth use. Other control channel modifications include the use of additional control channels (e.g., for eMBMS scheduling, or to indicate the length of variable length UL and DL bursts), or control channels transmitted at different intervals. An eCC may also include modified or additional HARQ related control information.

Variable length TTIs may be used for both downlink and uplink and may be associated with reduced or low latency communications. For example, low latency communications may involve downlink transmissions on a physical downlink shared channel (PDSCH) followed by an acknowledgment on a physical uplink control channel (PUCCH). PUCCH may be used for acknowledging downlink transmissions, scheduling requests (SRs) and channel quality indicators (CQI) and other UL control information.

A PUCCH may be mapped to a control channel defined by a code and two consecutive resource blocks, in some cases. Uplink control signaling may depend on the presence of timing synchronization for a cell. PUCCH resources for SR and CQI reporting may be assigned (and revoked) through RRC signaling. In some cases, resources for SR may be assigned after acquiring synchronization through a random access channel (RACH) procedure. In other cases, an SR may not be assigned to a UE 115 through the RACH (e.g., synchronized UEs may or may not have a dedicated SR channel). PUCCH resources for SR and CQI may be lost when the UE is no longer synchronized. In some cases, and as mentioned above, a low latency PUCCH may be referred to as uPUCCH and may be transmitted during a shorter duration TTI (e.g., one symbol, two symbol, one slot, etc.). A uPUCCH may be multiplexed with other channels during an uplink TTI.

Acknowledgment information may be an aspect of a HARQ process. HARQ may be a method of ensuring that data is received correctly over a communication link 125. HARQ may include a combination of error detection (e.g., using a CRC), FEC, and retransmission (e.g., automatic repeat request (ARQ)). HARQ may improve throughput at a medium access control (MAC) layer in poor radio conditions (e.g., signal-to-noise conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. This may be especially useful in poor conditions. In other cases, redundancy bits are not added to each transmission, but are retransmitted after the transmitter of the original message receives a NACK indicating a failed attempt to decode the information, rather than an ACK that the message was successfully decoded. The chain of transmission, response and retransmission may be referred to as a HARQ process. In some cases, a limited number of HARQ processes may be used for a given communication link 125.

HARQ retransmission may be associated with a retransmission delay. For example, in some cases, HARQ feedback is sent 4 ms after a DL transmission that is not correctly received, and the base station retransmits the data 4 ms after receiving the feedback (for a round trip time of 8 ms). In some cases, this latency may be reduced by reducing the TTI length (e.g., by employing a shorter duration TTI as described herein). For example, if the TTI duration is one symbol period the round trip time may be less than or equal to 1 ms. Although, under certain radio conditions (e.g., poor uplink conditions), low latency data transmissions may be more efficiently acknowledged by using longer duration TTIs for uplink transmissions.

Thus, a UE 115 may receive a low latency data transmission and transmit a non-low latency PUCCH message in response to the low latency data transmission. In some cases, the PUCCH message may include bundled HARQ feedback for multiple low latency transmissions. The PUCCH message may include HARQ feedback for low latency transmissions bundled with acknowledgment information for non-low latency transmissions. In some cases, the HARQ feedback is compressed based on the starting point and run length of consecutive NACKs. A serving base station 105 may receive the non-low latency control message and, if the control message includes a NACK, retransmit the data using a low latency data channel.

Figure 2:
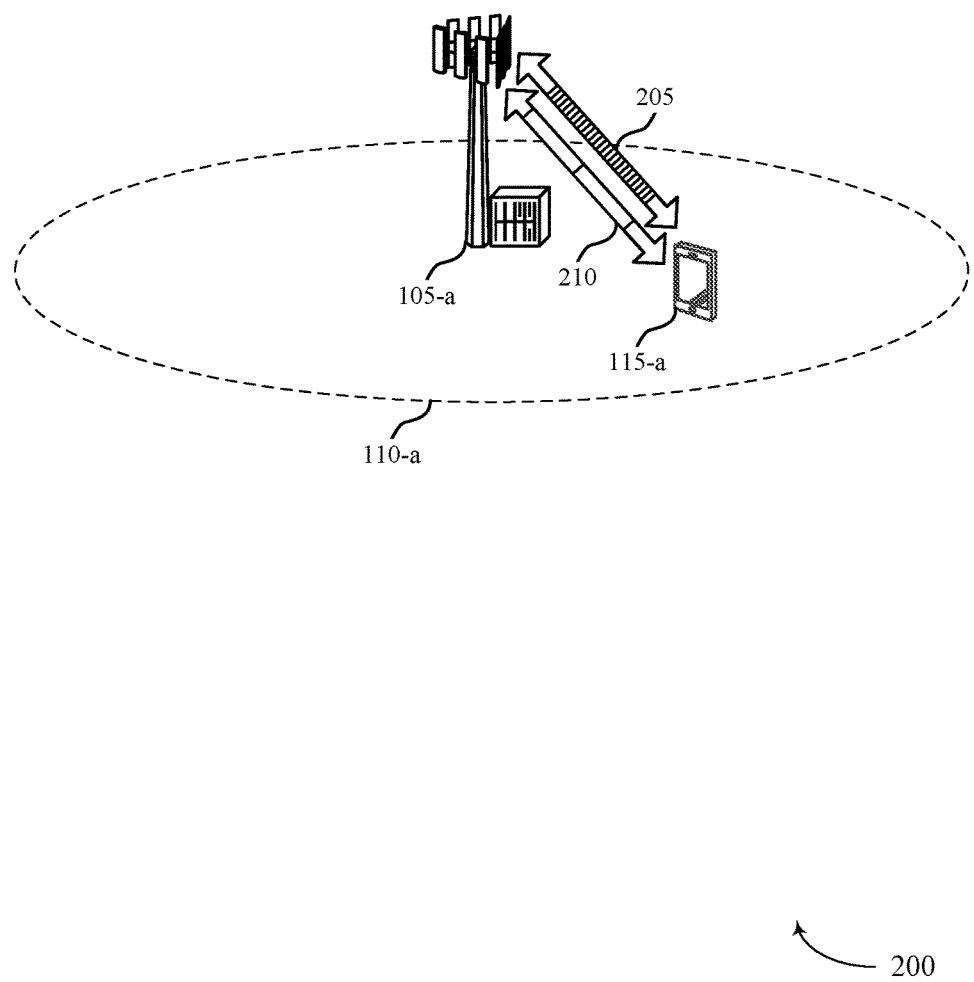
FIG. 2 illustrates an example of a wireless communications system that supports various PUCCH configurations associated with low latency downlink communication, in accordance with aspects of the present disclosure.

FIG. 2 illustrates an example of a wireless communications system 200 that supports various PUCCH configurations associated with low latency downlink communication, in accordance with aspects of the present disclosure. Wireless communications system 200 may include base station 105-a having a geographic coverage area 110-a, and UE 115-a, which may be examples of the corresponding devices described with reference to FIG. 1. Wireless communications system 200 may support the use of non-low latency uplink control messages (e.g., using non-low latency channel 210) in response to low latency data transmissions between base station 105-a and UE 115-a (e.g., using non-low latency channel 205).

Wireless communications system 200 may utilize low latency communication to provide enhanced throughput and reduced packet acknowledgment response timing. These wireless systems may utilize a non-low latency PUCCH to communicate UCI for low latency communications such as HARQ information or scheduling requests. In some cases, low latency communications may use different numerology and timing, but in other cases the numerology and timing may be the same as non-low latency communications (e.g., 15 kHz tone spacing and orthogonal symbol durations).

Low latency communications may be based on a different TTI length of, for example, one-symbol, two-symbols, or one-slot TTI. A non-low latency PUCCH, for example a one-slot or one-subframe based PUCCH or a similar length physical uplink shared channel (PUSCH), may be used to handle HARQ for downlink low latency transmissions. The non-low latency (e.g., one subframe) PUCCH may be used in addition to, or as replacement for, a uPUCCH-based HARQ feedback. In a synchronous frequency division duplexing (FDD) wireless system, each low latency TTI may include up to, for example, eight HARQ processes.

The PUCCH may have various formats (e.g., PUCCH format 1, 1a, 1b, 2, etc.) for different combinations of uplink control information. Some or all PUCCH formats may be compatible with low latency communications. PUCCH formats compatible with low latency systems may also support non-low latency physical downlink shared channel (PDSCH) HARQ feedback.

UE 115-a may support either uPUCCH, or non-low latency PUCCH, or both uPUCCH and non-low latency PUCCH for transmitting feedback. In scenarios in which UE 115-a is in poor radio conditions, non-low latency PUCCH based HARQ feedback may be employed. For example, if UE 115-a is in poor channel conditions, it may utilize a one-subframe based PUCCH to provide HARQ feedback for downlink low latency transmissions (e.g., downlink transmissions using one-symbol, two-symbols, or one-slot TTIs), while UEs 115 in relatively better channel conditions may use uPUCCH. The channel conditions may be determined based on a reference signal received power (RSRP), a channel state information (CSI) report, or other methods in various examples. Base station 105-a may use a group acknowledgment signal to perform re-transmissions, which may be faster than other re-transmissions, for example, retransmissions based on a RRC signal.

As an example, a PUCCH format such as PUCCH format 1a (or 1b) may carry one bit (or two bits). The PUCCH may utilize a payload in various ways if it corresponds to both low latency and non-low latency data transmissions. For example, if the PUCCH format is a one-bit PUCCH such as format 1a, the one bit may include bundled low latency and non-low latency acknowledgment information. For a two-bit PUCCH format, such as 1b, the PUCCH may include one bit for low latency data and one bit for non-low latency data. For example, one bit may be used for ACK/NACK bundling for the non-low latency data if the non-low latency data is associated with a multiple-input, multiple-output (MIMO) transmission mode or multiple subframes. The other bit may include bundled ACK/NACK information for the low latency data, as there may be multiple low latency transmissions handled by one PUCCH. If the system is operation in a low latency mode (e.g., without non-low latency PDSCH), the entire payload of a PUCCH message may be dedicated to low latency transmissions.

If a PUCCH format such as 1a or 1b with channel selection is used, the PUCCH may include, for example, four bits, and a similar design may be adopted. For example, the wireless system may use two bits for low latency and two bits for non-low latency transmissions. For these four bit PUCCH formats, ACK/NACK bundling may still be appropriate for low latency or non-low latency PDSCH transmissions. A PUCCH format such as 2, 2a or 2b with a 1 or 2 bit HARQ ACK/NACK may be utilized in a similar manner to PUCCH formats 1a or 1b.

In some PUCCH formats, such as PUCCH format 3, a larger number of bits may be used for ACK/NACK, such as 21 bits in PUCCH format 3. In other formats, an even larger number of ACK/NACK bits may be used. HARQ bundling may still be used for PUCCH formats with a large number of bits such as PUCCH format 3 or possible future PUCCH formats. For example, HARQ bundling may be used if the HARQ payload does not match the capacity of the PUCCH format. HARQ bundling may also be used to reduce the HARQ payload along with coverage enhancement techniques (e.g., repetition levels) or to reduce uplink overhead. The PUCCH format for low latency (e.g., PUCCH format 1, 1a, 1b, 2, 3 etc.) may be semi-statically configured for dynamically indicated. In some cases, re-transmission of low latency transmissions may be performed using a non-low latency PDSCH.

The division or split between low latency portions of the HARQ payload and non-low latency portions of the HARQ payload may be dynamic and may be based on factors such as a nominal HARQ payload size for non-low latency PDSCH. The nominal HARQ payload for non-low latency PDSCH may be based on a number of non-low latency PDSCH component carriers (CCs) configured for UE 115-a, a downlink transmission mode for each CC, a duplexing configuration, the downlink or uplink subframe configuration, and other factors. The split of the HARQ payload may also be based on a nominal low latency payload, which may be based on a number of low latency CCs or a number of low latency transmissions associated with a particular PUCCH transmission opportunity. The split of the HARQ payload may also be based on a HARQ termination target, a HARQ importance, or a prioritization of low latency data and non-low latency data.

In some cases, the split of a HARQ payload between low latency and non-low latency may be configurable. A configurable split may provide flexibility for a base station in managing tradeoffs between HARQ for low latency and non-low latency data. For example, in a 10 bit total ACK/NACK payload, the split between low latency and non-low latency may be, for example, 4 bits and 6 bits respectively. Or, in another situation, the split between low latency and non-low latency may be 6 bits and 4 bits respectively.

A PUCCH may provide HARQ feedback for up to, for example, 14 low latency transmissions in a subframe in a FDD wireless system. In TDD, there may be more subframes requesting HARQ feedback in a single PUCCH transmission. In some cases, ACK/NACK bundling (e.g., spatial-domain bundling, time-domain bundling, CC-domain bundling, etc.) may not provide appropriate feedback. An example of inappropriate feedback may include a bundling limitation (e.g., only providing spatial bundling), or that, for example, a large HARQ payload for low latency may be associated with smaller low latency coverage and large uplink overhead.

In some cases a number, N, of low latency transmission opportunities may request a HARQ feedback in a PUCCH. The HARQ feedback may include an index of a first low latency PDSCH transmission with a decoding failure and an indication of a run length of consecutive decoding failures. Take, for example, a transmission of N=14 and a low latency TTI of one symbol. Low latency transmission opportunities may occur at indices 0, 1, 2, . . . 13. With a 6 bit low latency HARQ payload, UE 115-a may indicate a starting index using, for example, 4 bits (e.g., covering N=14 possibilities). UE 115-a may also indicate a run length. The run length indicator may use two bits to indicate, for example, that the run length may include one failure, two failures, or three failures. The remaining bit combination may be used to indicate that the current low latency transmission and all remaining low latency transmissions may be associated with a decoding failure.

For example, UE 115-a may detect that it is scheduled with low latency in, for example, indices 4, 5, 7, 8 and 9. If the UE fails to decode indices 7 and 8, the HARQ payload may be, for example "0111 01," which may indicate that the failure begins at index 7 and may include a run length of two indices. In another example, UE 115-a may fail to decode indices 7, 8, and 9. In this example, the HARQ payload may be, for example, "0111 10," which may indicate failures beginning at index 7 and having a failure run length of three indices. If UE 115-a does not detect that it is scheduled in a downlink low latency transmission opportunity, UE 115-a may treat the downlink low latency transmission as an ACK. Alternatively, UE 115-a may treat the transmission as a NACK. Then, for example, if UE 115-a fails to decode indices 7 and 8, the HARQ payload may be, for example, "0000" (e.g., UE 115-a did not detect low latency transmission in the first transmission opportunity)+"10". This approach may be less appropriate if not scheduled at the beginning of transmission.

If the number of low latency transmissions requiring feedback in the same PUCCH is large, the number of low latency HARQ processes may be large as well. In some cases, a predetermined number of HARQ processes (e.g., 8) may be used (e.g., for soft buffer management). So, of a UE is scheduled for 14 transmissions, some HARQ processes may be associated with more than one downlink low latency transmission. ACK/NACK bundling may be done for HARQ transmission of the processes. If UE 115-a detects more than one transmission using the same HARQ process, it may store soft channel bits for the latest received low latency transmission. Alternatively, the wireless system may impose a restriction that the base station may only schedule a certain number of downlink transmissions (e.g., a limit of 8).

The use of PUCCH for low latency wireless systems may be semi-statically or dynamically triggered. If, for example, the trigger is performed using non-low latency control channels or using an RRC configuration, the window size for low latency transmissions under the same PUCCH may be aligned with the subframe boundaries. If the trigger is performed using a low latency PDCCH, the window may not be aligned with the subframe boundary. Thus, if a PDCCH is sent by the base station in response to a uPUCCH that was unsuccessfully received, the base station may already know the starting index of the run of NACKs and the index may be omitted by the UE in the corresponding PUCCH.

Figure 3:
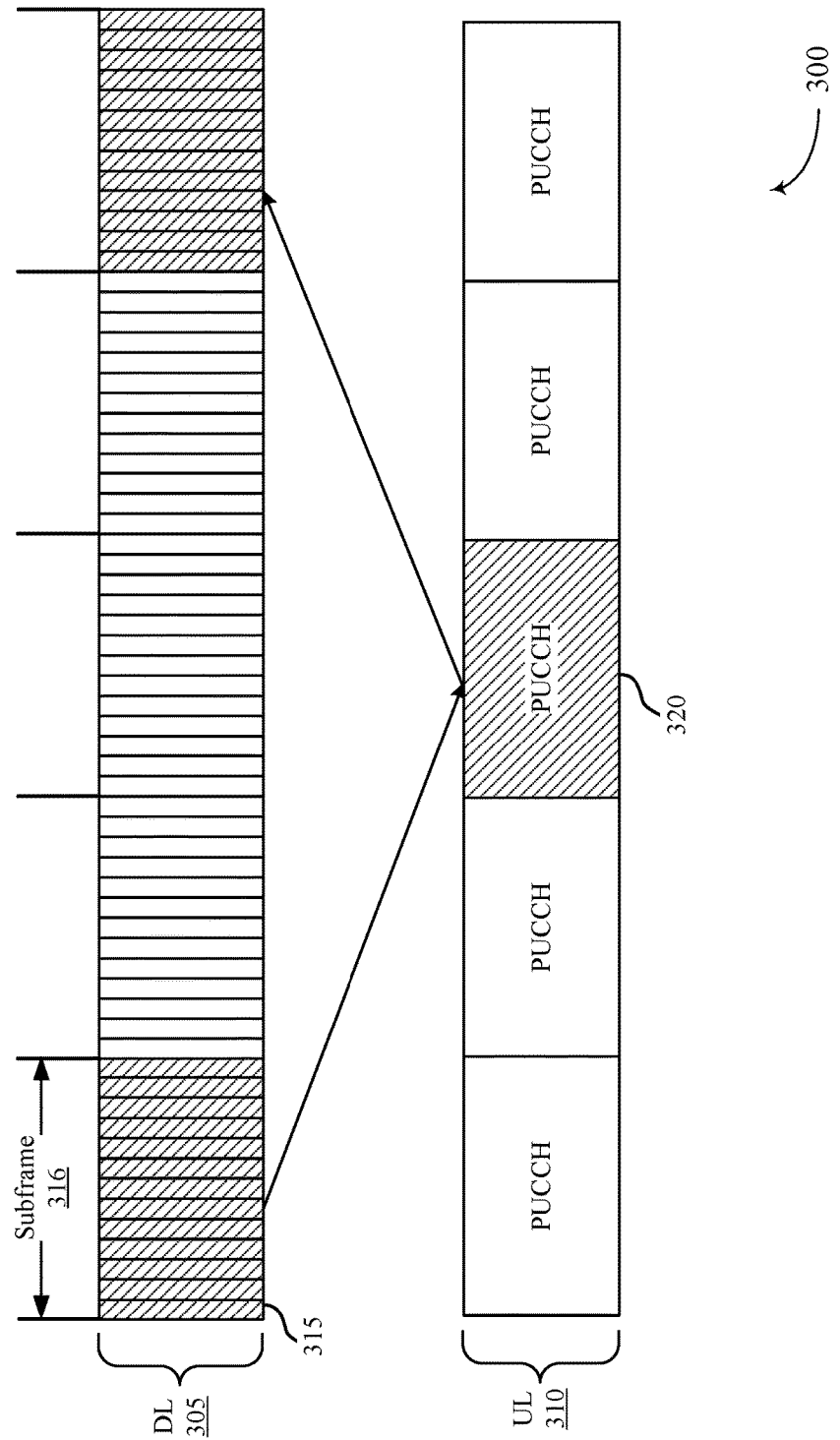
FIGS. 3 and 4 illustrates an uplink control processes with exemplary PUCCH configurations for low latency downlink communication, in accordance with aspects of the present disclosure.

FIG. 3 illustrates an uplink control process 300 with an exemplary PUCCH configuration for low latency downlink communication, in accordance with aspects of the present disclosure. In some cases, uplink control process 300 may represent aspects of techniques performed by a UE 115 or base station 105 as described with reference to FIGS. 1 and 2.

In the example of FIG. 3, uplink control process 300 depicts low latency downlink transmissions during downlink TTIs 315 on a downlink carrier 305 of an FDD configuration, and HARQ feedback transmitted on a non-low latency PUCCH during a uplink TTI 320 (e.g., a subframe) on uplink carrier 310 of the FDD configuration. The uplink TTI 320 may have a different, greater duration than downlink TTIs 315. In some cases, the downlink TTIs 315 align with a subframe 316 of the downlink carrier 305. For example, the TTI length of a downlink TTI 315 for low latency may be equivalent to one symbol period, two symbol periods, one slot length, or another duration. The TTI duration of the uplink TTI 320 (and of the uplink carrier 310 in general) may be 1 subframe (e.g., 1 ms) or another duration that is longer than the duration of the downlink TTIs 315.

Figure 4:
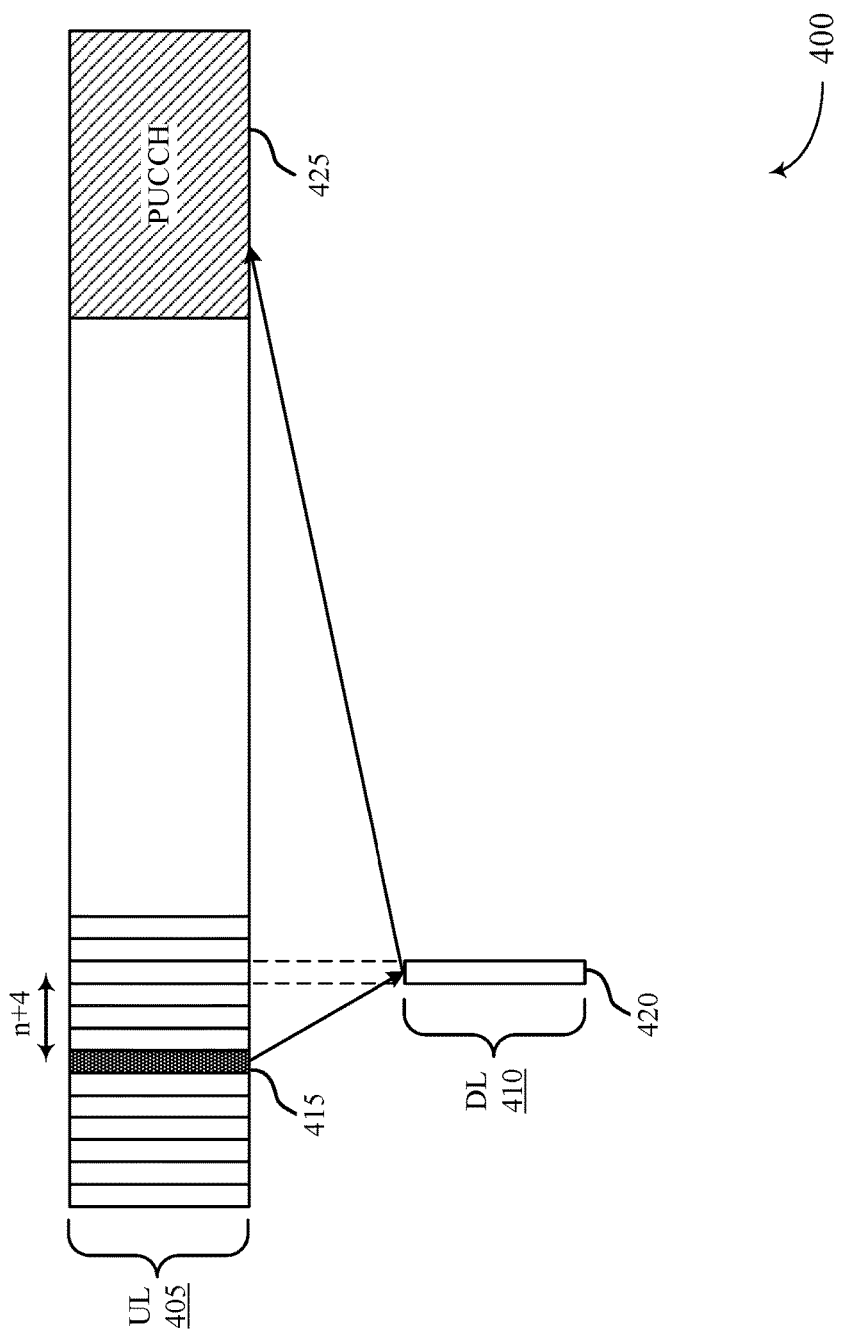

FIG. 4 illustrates an uplink control process 400 with an exemplary PUCCH configuration for low latency downlink communication, in accordance with aspects of the present disclosure. In some cases, uplink control process 400 may represent aspects of techniques performed by a UE 115 or base station 105 as described with reference to FIGS. 1 and 2.

In the example of FIG. 4, uplink control process 400 shows an example in which a base station 105 may implicitly determine a starting point for a run of one or more NACKs. A UE 115 may transmit a sequence of uPUCCH transmissions on uplink carrier 405 (or during an uplink period of a TDD carrier), including NACK 415, which may be a single NACK or the first of a string of NACKs. The base station may not correctly receive the NACK 415 (or may determine that an error is likely) and may transmit a uPDCCH 420 on downlink channel 410 to request transmission of a non-low latency PUCCH 425 with acknowledgment information for several downlink TTIs. Since the non-low latency PUCCH 425 may be triggered by the uPDCCH 420, the base station may implicitly determine the index of the starting point for a string of NACKs based on the symbol period of uPDCCH 420. For example, the starting index of the string of NACKs may be implicitly determined to be four (4) symbol periods prior to transmission of uPDCCH 420.

So for example, if non-low latency PUCCH 425 contains compressed HARQ feedback (based on a run length and starting position) for a number of low latency transmissions, including downlink transmission corresponding to NACK 415, non-low latency PUCCH 425 may include a run length and not the starting index of the run.

Figure 5:
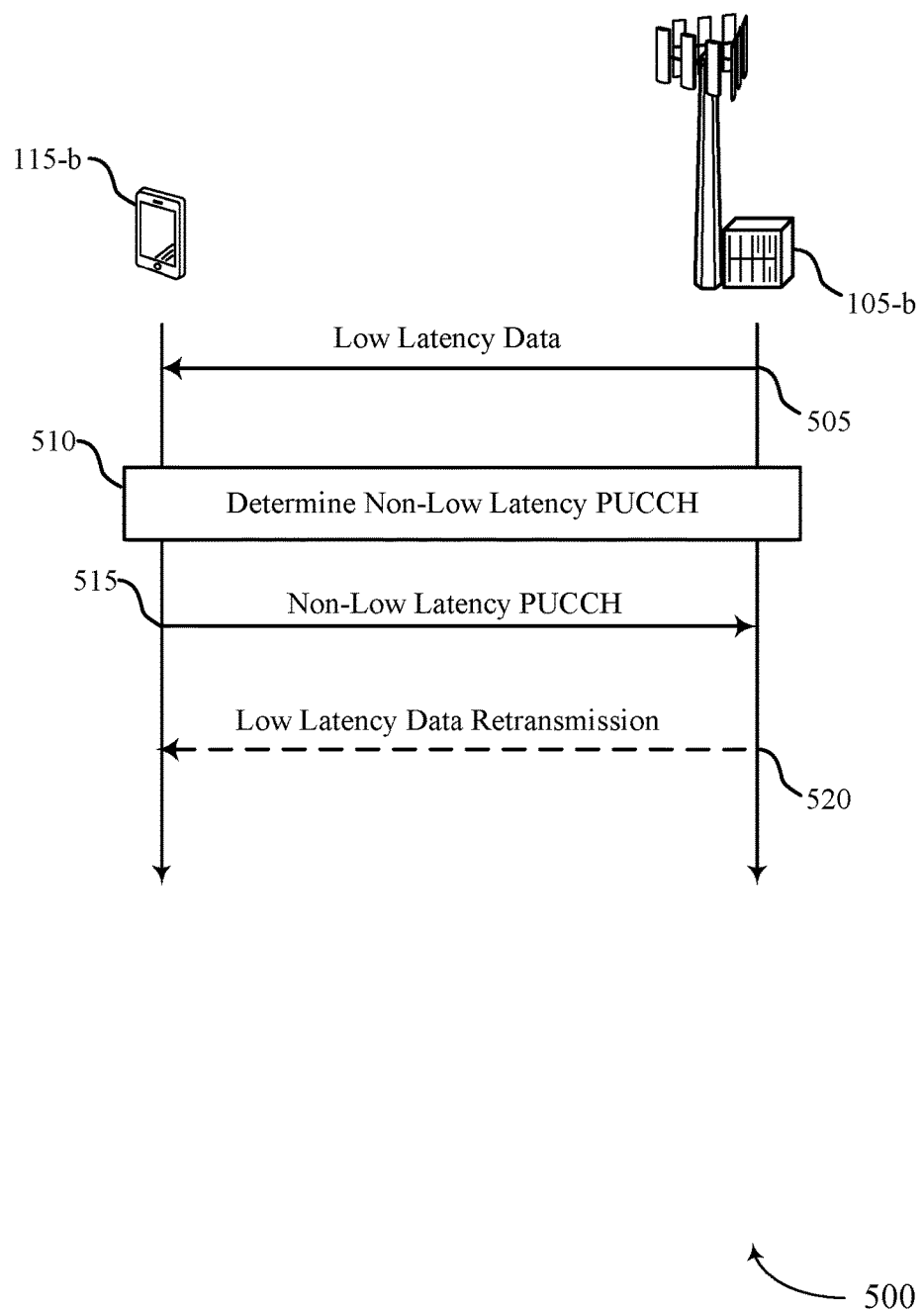
FIG. 5 illustrates an example of a process flow in a system that supports various PUCCH configurations associated with low latency downlink communication, in accordance with aspects of the present disclosure.

FIG. 5 illustrates an example of a process flow in a system that supports various PUCCH configurations associated with low latency downlink communication, in accordance with aspects of the present disclosure. Process flow 500 may include base station 105-*b* and UE 115-*b*, which may be examples of the corresponding devices described with reference to FIG. 1-2.

At step 505, base station 105-*b* may send a low latency data transmission to UE 115-*b*. Thus, UE 115-*b* may receive a data transmission during a first TTI that has a first duration. In some cases, base station 105-*b* may transmit (and UE 115-*b* may receive) multiple data transmissions, and each data transmission may be received during a TTI with the first duration.

In some cases, base station 105-*b* may transmit (and UE 115-*b* may receive) an additional data transmission during a third TTI, and a control message from the UE 115-*b* may include acknowledgment information for the additional data transmission. In some cases, the third TTI has the second duration. That is, UE 115-*b* may receive both low latency and non-low latency data.

At step 510, UE 115-*b* and base station 105-*b* may determine that the HARQ feedback for the low latency data transmission will be included in a non-low latency PUCCH message. In some cases, UE 115-*b* and base station 105-*b* may identify a first number of bits for the first field and second number of bits for the second field, and a sum of the first number of bits and the second number of bits may equal a total number of bits available for the acknowledgment information in the control message.

In some cases, UE 115-*b* and base station 105-*b* may identify a number of bits available for the acknowledgment information in the control message, where the number of bits is less than a number of the plurality of data transmissions (e.g., the message may include compressed HARQ feedback). Thus, UE 115-*b* may identify a sequence that includes a decoding indicator for each data transmission of data transmissions, and the sequence may include a sub-sequence of decoding failure indicators. UE 115-*b* may then compress the sequence based on a starting index of the sub-sequence and a run length of the sub-sequence.

In some cases, base station 105-*b* may transmit and UE 115-*b* may receive a downlink control message during a third TTI that has the first duration. Then, UE 115-*b* and base station 105-*b* may identify the second TTI for transmission of the control message based on the downlink control message.

In some cases, identifying the second TTI for transmission of the control message is based on a RRC configuration. Identifying the second TTI for transmission of the control message may be based on a channel condition.

At step 515, UE 115-*b* may transmit a non-low latency PUCCH to base station 105-*b*. Thus, UE 115-*b* may transmit (and base station 105-*b* may receive) a control message during a second TTI that has a second duration greater than the first duration, and the control message may include acknowledgment information for the data transmission. A bit of the control message may correspond to the acknowledgment information for the data transmission and the acknowledgment information for the additional data transmission. In some cases, the control message includes a first field that corresponds to data transmissions during TTIs with the first duration and a second field that corresponds to data transmission during TTIs with the second duration.

The control message may include an indicator of the starting index of the sub-sequence and an indicator of the run length of the sub-sequence. In some examples, the control message includes an indicator of the run length of the sub-sequence, and the starting index of the sub-sequence may correspond to a location of a downlink control message. In some cases, each bit of the control message corresponds to a unique hybrid automatic repeat request (HARQ) process.

At step 520, if the non-low latency PUCCH includes a NACK, base station 105-*b* may retransmit one or more blocks of data using the low latency downlink channel.

Figure 6:
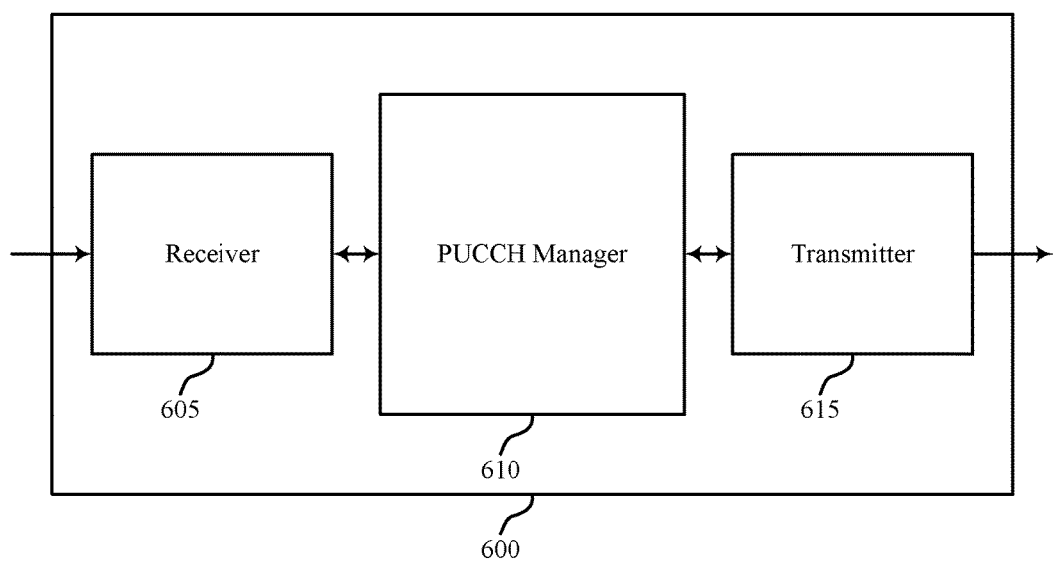
FIGS. 6 and 7 show block diagrams of a wireless device or devices that support various PUCCH configurations associated with low latency downlink communication, in accordance with aspects of the present disclosure.

FIG. 6 shows a block diagram of a wireless device 600 that supports various PUCCH configurations associated with low latency downlink communication, in accordance with aspects of the present disclosure. Wireless device 600 may be an example of aspects of a UE 115 described with reference to FIGS. 1, 2, and 5. Wireless device 600 may include receiver 605, PUCCH manager 610, and transmitter 615. Wireless device 600 may also include a processor. Each of these components may be in communication with one another.

The receiver 605 may receive information such as packets, user data, or control information associated with various information channels (e.g., control channels, data channels, and information related to non-low latency PUCCH for low latency downlink communication, etc.). Information may be passed on to other components of the device. The receiver 605 may be an example of aspects of the transceiver 925 described with reference to FIG. 9. The receiver 605 may include a single antenna, or it may include multiple antennas.

The PUCCH manager 610 may receive (e.g., in cooperation with the receiver 605) a data transmission during a first TTI that has a first duration and transmit (e.g., in cooperation with the transmitter 615) a control message during a second TTI that has a second duration greater than the first duration, where the control message includes acknowledgment information for the data transmission. The PUCCH manager 610 may be an example of aspects of the PUCCH manager 905 described with reference to FIG. 9.

The transmitter 615 may transmit signals received from other components of wireless device 600. In some examples, the transmitter 615 may be collocated with a receiver in a transceiver module. For example, the transmitter 615 may be an example of aspects of the transceiver 925 described with reference to FIG. 9. The transmitter 615 may include a single antenna, or it may include multiple antennas.

Figure 7:
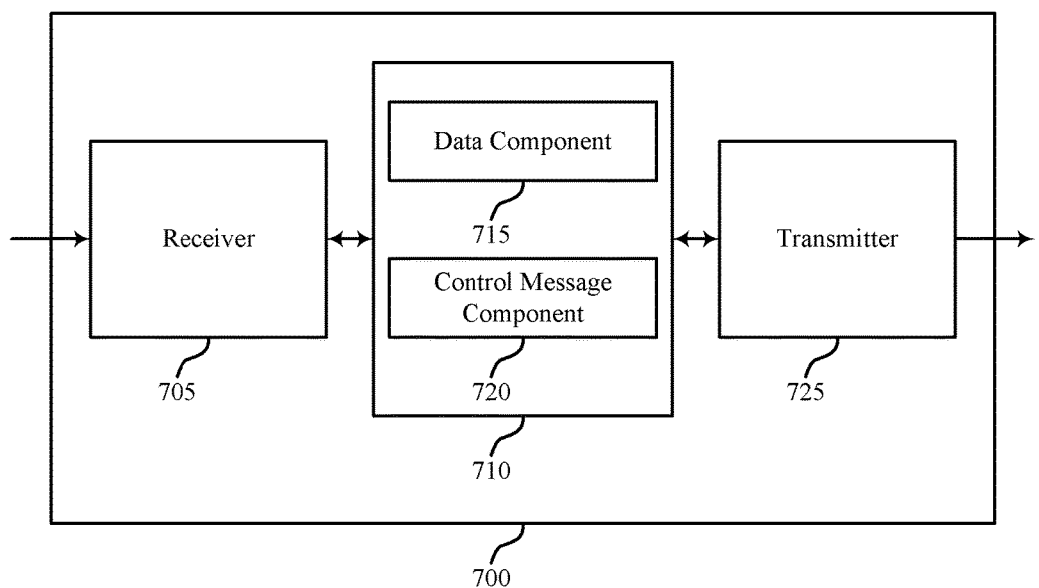

FIG. 7 shows a block diagram of a wireless device 700 that supports various PUCCH configurations associated with low latency downlink communication, in accordance with aspects of the present disclosure. Wireless device 700 may be an example of aspects of a wireless device 600 or a UE 115 described with reference to FIGS. 1, 2, 5 and 6. Wireless device 700 may include receiver 705, PUCCH manager 710 and transmitter 725. Wireless device 700 may also include a processor. Each of these components may be in communication with one another.

The receiver 705 may receive information which may be passed on to other components of the device. The receiver 705 may also perform the functions described with reference to the receiver 605 of FIG. 6. The receiver 705 may be an example of aspects of the transceiver 925 described with reference to FIG. 9. The receiver 705 may utilize a single antenna, or it may utilize multiple antennas.

The PUCCH manager 710 may be an example of aspects of PUCCH manager 610 described with reference to FIG. 6. The PUCCH manager 710 may include data component 715 and control message component 720. The PUCCH manager 710 may be an example of aspects of the PUCCH manager 905 described with reference to FIG. 9.

The data component 715 may receive (e.g., in cooperation with the receiver 705) a data transmission during a first TTI that has a first duration. In some examples the data component 715 may receive multiple data transmissions, where each of the multiple data transmissions may be received during a TTI with the first duration. In some examples the data component 715 may receive an additional data transmission during a third TTI, and a control message may include acknowledgment information for the additional data transmission. In some cases, the third TTI has the second TTI duration.

The control message component 720 may transmit (e.g., in cooperation with the transmitter 725) a control message during a second TTI that has a second duration greater than the first duration. The control message may include acknowledgment information for the data transmission(s) received by the data component 715. In some cases, the control message includes an indicator of the starting index of the sub-sequence and an indicator of the run length of the sub-sequence. In some cases, the control message includes an indicator of the run length of the sub-sequence, where the starting index of the sub-sequence corresponds to a location of a downlink control message. Additionally or alternatively, the control message may include an indicator of the starting index of the sub-sequence and an indicator of the run length of the sub-sequence. In some cases, the control message includes an indicator of the run length of the sub-sequence, and the starting index of the sub-sequence may correspond to a location of a downlink control message.

The transmitter 725 may transmit signals received from other components of wireless device 700. In some examples, the transmitter 725 may be collocated with a receiver in a transceiver module. For example, the transmitter 725 may be an example of aspects of the transceiver 925 described with reference to FIG. 9. The transmitter 725 may utilize a single antenna, or it may utilize multiple antennas.

Figure 8:
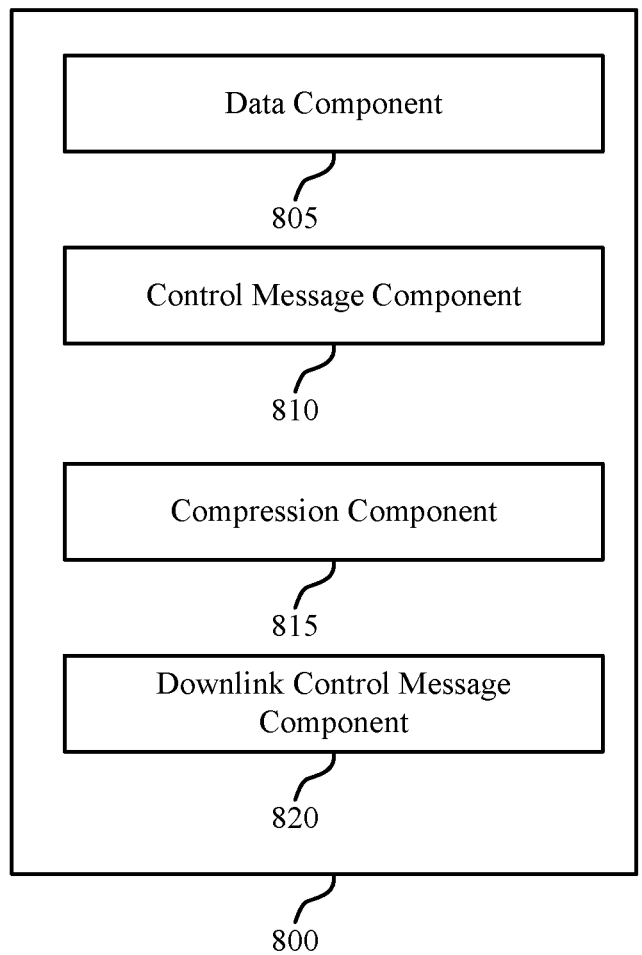
FIG. 8 shows a block diagram of a PUCCH manager that supports various PUCCH configurations associated with low latency downlink communication, in accordance with aspects of the present disclosure.

FIG. 8 shows a block diagram of a PUCCH manager 800 that supports various PUCCH configurations associated with low latency downlink communication, in accordance with aspects of the present disclosure. PUCCH manager 800 may be an example of aspects of PUCCH manager 610 or PUCCH manager 710 described with reference to FIGS. 6 and 7. The PUCCH manager 800 may also be an example of aspects of the PUCCH manager 905 described with reference to FIG. 9.

The PUCCH manager 800 may include data component 805, control message component 810, compression component 815 and downlink control message component 820. Each of these modules may communicate, directly or indirectly, with one another (e.g., via one or more buses).

The data component 805 may receive (e.g., in cooperation with a receiver, such as a receiver 605 or 705 described with reference to FIG. 6 or 7) a data transmission during a first TTI that has a first duration. In some examples the data component 805 may receive multiple data transmissions, and each of the multiple data transmissions may be received during a TTI with the first duration. In some examples the data component 805 may receive an additional data transmission during a third TTI.

The control message component 810 may transmit (e.g., in cooperation with a transmitter, such as a transmitter 615 or 725 as described with reference to FIG. 6 or 7) a control message during a second TTI that has a second duration greater than the first duration. In some examples control message may include acknowledgment information for the data transmission(s) received by the data component 805. The control message may include acknowledgment information for an additional data transmission received during a third TTI. In some cases, the control message includes an indicator of the starting index of the sub-sequence and an indicator of the run length of the sub-sequence. Additionally or alternatively, the control message may include an indicator of the run length of the sub-sequence, and the starting index of the sub-sequence may correspond to a location of a downlink control message. In some cases, the control message includes an indicator of the starting index of the sub-sequence and an indicator of the run length of the sub-sequence. In some examples, the control message includes an indicator of the run length of the sub-sequence, and the starting index of the sub-sequence may correspond to a location of a downlink control message.

The compression component 815 may identify a number of bits available for acknowledgment information in a control message. The number of bits may be less than a number of a plurality of data transmissions received by the data component 805.

The downlink control message component 820 may receive (e.g., in cooperation with a receiver, such as a receiver 605 or 705 described with reference to FIG. 6 or 7) a downlink control message during a third TTI that has the first TTI duration.

Figure 9:
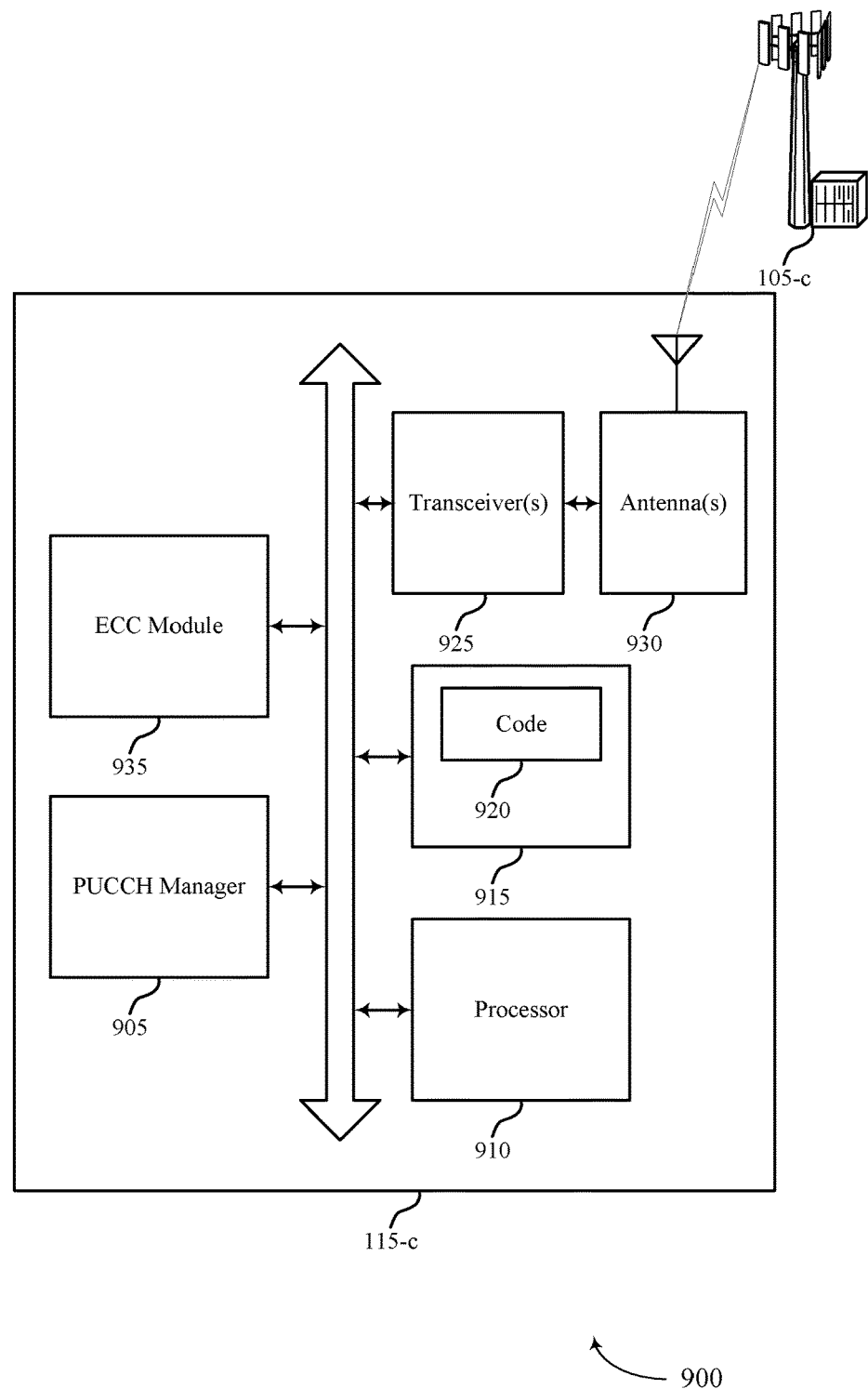
FIG. 9 illustrates a block diagram of a system including a UE that supports various PUCCH configurations associated with low latency downlink communication, in accordance with aspects of the present disclosure.

FIG. 9 illustrates a block diagram of a system 900 including a UE that supports various PUCCH configurations associated with low latency downlink communication, in accordance with aspects of the present disclosure. For example, system 900 may include UE 115-c, which may be an example of a wireless device 600, a wireless device 700, or a UE 115 as described with reference to FIGS. 1, 2, and 5 through 8.

UE 115-c may also include PUCCH manager 905, processor 910, memory 915, transceiver(s) 925, antenna(s) 930 and eCC module 935. Each of these modules may communicate, directly or indirectly, with one another (e.g., via one or more buses).

The PUCCH manager 905 may be an example of aspects of PUCCH managers as described with reference to FIGS. 6 through 8. The processor 910 may include an intelligent hardware device, (e.g., a central processing unit (CPU), a microcontroller, an application specific integrated circuit (ASIC), etc.)

The memory 915 may include random access memory (RAM) and read only memory (ROM). The memory 915 may store computer-readable, computer-executable code 920 including instructions that, when executed, cause the processor to perform various functions described herein (e.g., non-low latency PUCCH for low latency downlink communication, etc.). In some cases, the code 920 may not be directly executable by the processor but may cause a computer (e.g., when compiled and executed) to perform functions described herein.

The transceiver(s) 925 may communicate bi-directionally, via one or more antenna(s) 930, wired, or wireless links, with one or more networks, as described above. For example, the transceiver(s) 925 may communicate bi-directionally with a base station 105 (e.g., base station 105-*c*) or a UE 115. The transceiver(s) 925 may also include a modem to modulate the packets and provide the modulated packets to the antennas for transmission, and to demodulate packets received from the antenna(s) 930. In some cases, the wireless device may include a single antenna 930. In some cases the device may have more than one antenna 930, which may be capable of concurrently transmitting or receiving multiple wireless transmissions.

The eCC module 935 may enable operations using eCCs such as communication using shared or unlicensed spectrum, using reduced TTIs or subframe durations, or using a large number of component carriers (CCs).

Figure 10:
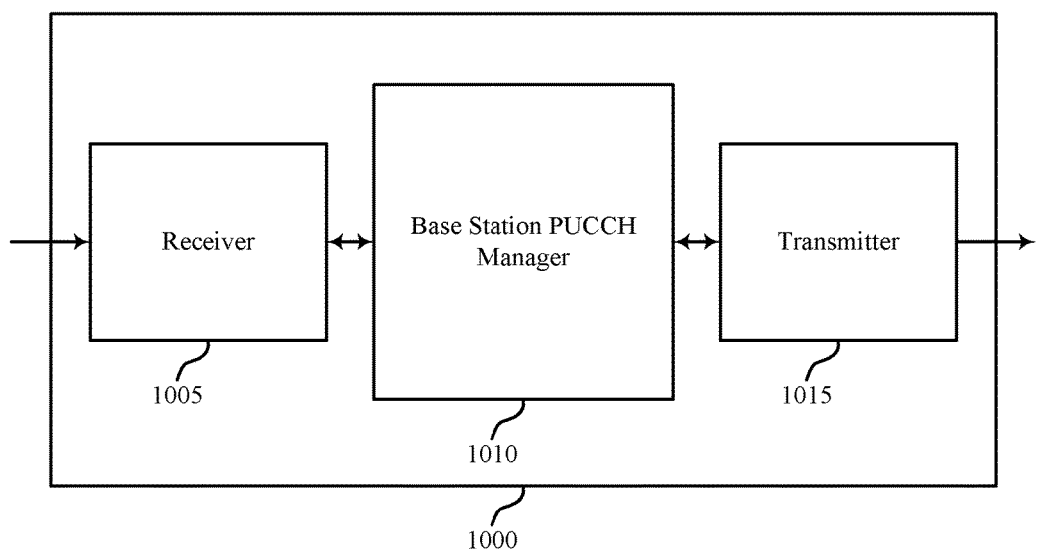
FIGS. 10 and 11 show block diagrams of a wireless device or devices that support various PUCCH configurations associated with low latency downlink communication, in accordance with aspects of the present disclosure.

FIG. 10 shows a block diagram of a wireless device 1000 that supports various PUCCH configurations associated with low latency downlink communication, in accordance with aspects of the present disclosure. Wireless device 1000 may be an example of aspects of a base station 105 described with reference to FIG. 1, 2, 5, or 9. Wireless device 1000 may include receiver 1005, base station PUCCH manager 1010 and transmitter 1015. Wireless device 1000 may also include a processor. Each of these components may be in communication with each other.

The receiver 1005 may receive information such as packets, user data, or control information associated with various information channels (e.g., control channels, data channels, and information related to non-low latency PUCCH for low latency downlink communication, etc.). Information may be passed on to other components of the device. The receiver 1005 may be an example of aspects of the transceiver 1325 described with reference to FIG. 13.

The base station PUCCH manager 1010 may transmit (e.g., in cooperation with the transmitter 1015) data during a first TTI that has a first duration and receive (e.g., in cooperation with the receiver 1005) a control message during a second TTI that has a second duration greater than the first duration. The control message may include acknowledgment information for the data transmission. The base station PUCCH manager 1010 may also be an example of aspects of the base station PUCCH manager 1305 described with reference to FIG. 13.

The transmitter 1015 may transmit signals received from other components of wireless device 1000. In some examples, the transmitter 1015 may be collocated with a receiver in a transceiver module. For example, the transmitter 1015 may be an example of aspects of the transceiver 1325 described with reference to FIG. 13. The transmitter 1015 may include a single antenna, or it may include multiple antennas.

Figure 11:
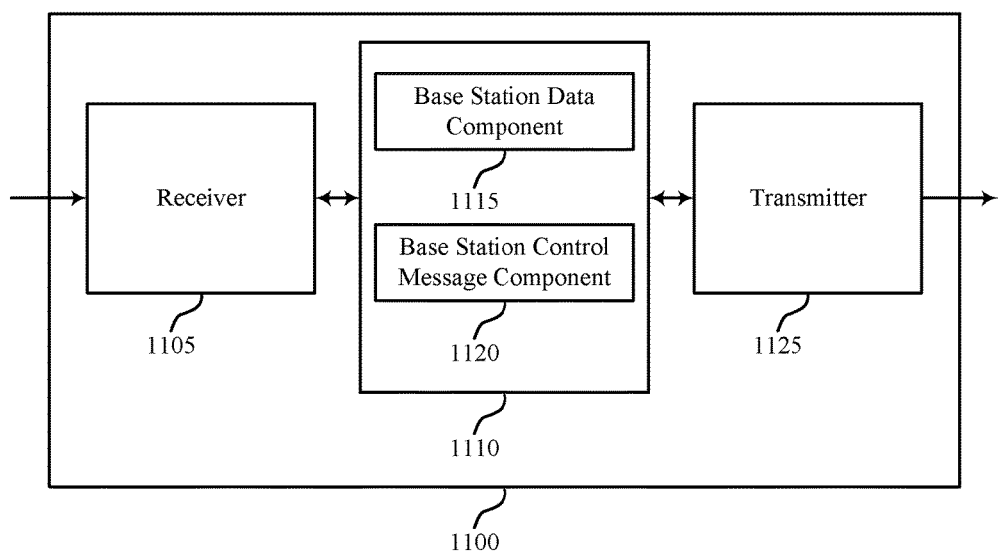

FIG. 11 shows a block diagram of a wireless device 1100 that supports various PUCCH configurations associated with low latency downlink communication, in accordance with aspects of the present disclosure. Wireless device 1100 may be an example of aspects of a wireless device 1000 or a base station 105 described with reference to FIGS. 1, 2, 5, and 10. Wireless device 1100 may include receiver 1105, base station PUCCH manager 1110 and transmitter 1125. Wireless device 1100 may also include a processor. Each of these components may be in communication with one another.

The receiver 1105 may receive information which may be passed on to other components of the device. The receiver 1105 may also perform the functions described with reference to the receiver 1005 of FIG. 10. The receiver 1105 may be an example of aspects of the transceiver 1325 described with reference to FIG. 13.

The base station PUCCH manager 1110 may be an example of aspects of base station PUCCH manager 1010 described with reference to FIG. 10. The base station PUCCH manager 1110 may include base station data component 1115 and base station control message component 1120. The base station PUCCH manager 1110 may be an example of aspects of the base station PUCCH manager 1305 described with reference to FIG. 13.

The base station data component 1115 may transmit (e.g., in cooperation with the transmitter 1125) data during a first TTI that has a first duration. The base station control message component 1120 may receive (e.g., in cooperation with the receiver 1105) a control message during a second TTI that has a second duration greater than the first duration. The control message may include acknowledgment information for the data transmission.

The transmitter 1125 may transmit signals received from other components of wireless device 1100. In some examples, the transmitter 1125 may be collocated with a receiver in a transceiver module. For example, the transmitter 1125 may be an example of aspects of the transceiver 1325 described with reference to FIG. 13. The transmitter 1125 may utilize a single antenna, or it may utilize multiple antennas.

Figure 12:
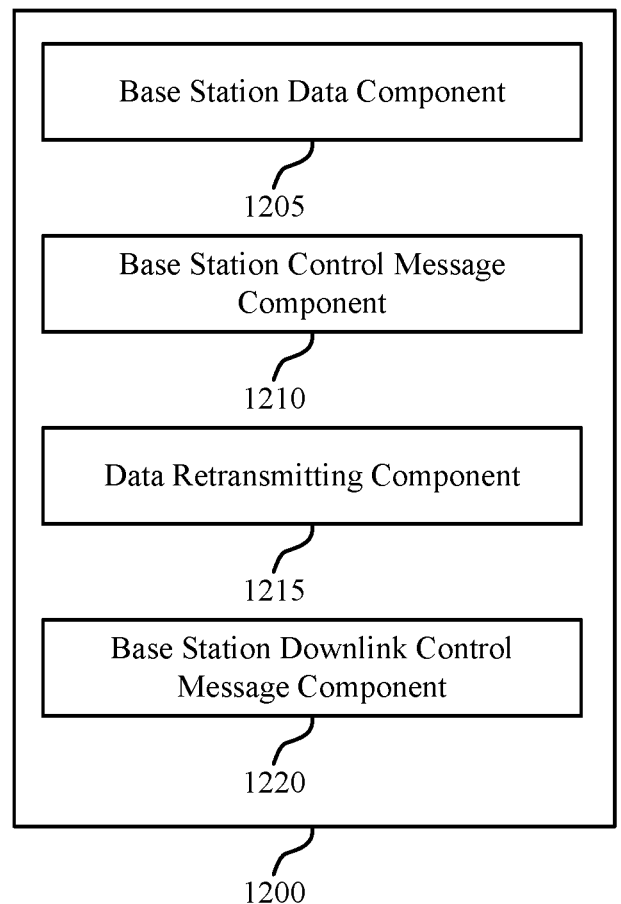
FIG. 12 shows a block diagram of a base station PUCCH manager that supports various PUCCH configurations associated with low latency downlink communication, in accordance with aspects of the present disclosure.

FIG. 12 shows a block diagram of a base station PUCCH manager 1200 that supports various PUCCH configurations associated with low latency downlink communication, in accordance with aspects of the present disclosure. Base station PUCCH manager 1200 may be an example of aspects of base station PUCCH manager 1010 or base station PUCCH manager 1110 described with reference to FIGS. 10 and 11. The base station PUCCH manager 1200 may also be an example of aspects of the base station PUCCH manager 1305 described with reference to FIG. 13.

The base station PUCCH manager 1200 may include base station data component 1205, base station control message component 1210, data retransmitting component 1215 and base station downlink control message component 1220. Each of these modules may communicate, directly or indirectly, with one another (e.g., via one or more buses).

The base station data component 1205 may transmit (e.g., in cooperation with a transmitter, such as a transmitter 1015 or 1125 as described with reference to FIG. 10 or 11) data during a first TTI that has a first duration. The base station control message component 1210 may receive (e.g., in cooperation with a receiver, such as a receiver 1005 or 1105 as described with reference to FIG. 10 or 11) a control message during a second TTI that has a second duration greater than the first duration. The control message may include acknowledgment information for the data transmission.

The data retransmitting component 1215 may retransmit (e.g., in cooperation with a transmitter, such as a transmitter 1015 or 1125 as described with reference to FIG. 10 or 11) the data during a third TTI that has the first TTI duration. Retransmission may be based on the acknowledgment information.

The base station downlink control message component 1220 may transmit (e.g., in cooperation with a transmitter, such as a transmitter 1015 or 1125 as described with reference to FIG. 10 or 11) a downlink control message during a third TTI that has the first TTI duration. The second TTI may be identifiable for transmission of the control message based on the downlink control message.

Figure 13:
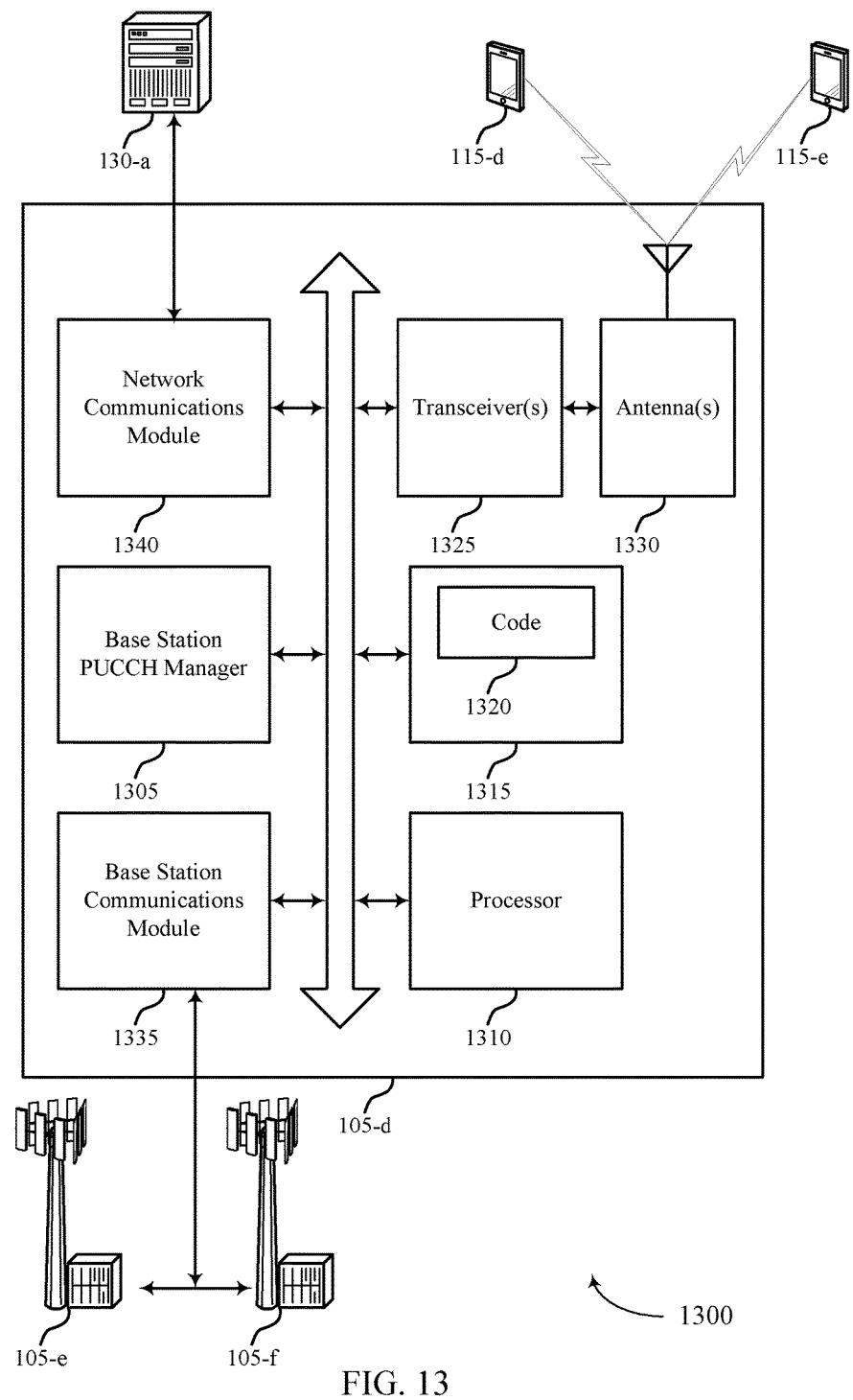
FIG. 13 illustrates a block diagram of a system including a base station that supports various PUCCH configurations associated with low latency downlink communication, in accordance with aspects of the present disclosure.

FIG. 13 illustrates a block diagram of a system 1300 including a base station that supports various PUCCH configurations associated with low latency downlink communication, in accordance with aspects of the present disclosure. For example, system 1300 may include base station 105-*d*, which may be an example of a wireless device 1000, a wireless device 1100, or a base station 105 as described with reference to FIGS. 1, 2, 5, and 10 through 12. Base station 105-*d* may also include components for bi-directional voice and data communications including components for transmitting communications and components for receiving communications. For example, base station 105-*d* may communicate bi-directionally with one or more UEs 115 (e.g., UEs 115-*d*, 115-*e*, etc.).

Base station 105-*d* may also include base station PUCCH manager 1305, processor 1310, memory 1315, transceiver(s) 1325, antenna(s) 1330, base station communications module 1335 and network communications module 1340. Each of these modules may communicate, directly or indirectly, with one another (e.g., via one or more buses).

The base station PUCCH manager 1305 may be an example of a base station PUCCH manager as described with reference to FIGS. 10 through 12.

The processor 1310 may include an intelligent hardware device, (e.g., a CPU, a microcontroller, an ASIC, etc.) The memory 1315 may include RAM and ROM. The memory 1315 may store computer-readable, computer-executable code 1320 including instructions that, when executed, cause the processor to perform various functions described herein (e.g., non-low latency PUCCH for low latency downlink communication, etc.). In some cases, the code 1320 may not be directly executable by the processor but may cause a computer (e.g., when compiled and executed) to perform functions described herein.

The transceiver(s) 1325 may communicate bi-directionally, via one or more antenna(s) 1330, wired, or wireless links, with one or more networks, as described above. For example, the transceiver(s) 1325 may communicate bi-directionally with a base station 105 (e.g., base stations 105-*e*, 105-*f*, etc.) or a UE 115 (e.g., UEs 115-*d*, 115-*e*, etc.). The transceiver(s) 1325 may also include a modem to modulate the packets and provide the modulated packets to the antenna(s) 1330 for transmission, and to demodulate packets received from the antenna(s) 1330. In some cases, the wireless device may include a single antenna 1330. However, in some cases the device may have more than one antenna 930, which may be capable of concurrently transmitting or receiving multiple wireless transmissions.

The base station communications module 1335 may manage communications with other base station 105, and may include a controller or scheduler for controlling communications with UEs 115 in cooperation with other base stations 105. For example, the base station communications module 1335 may coordinate scheduling for transmissions to UEs 115 for various interference mitigation techniques such as beamforming or joint transmission. In some examples, base station communications module 1335 may provide an X2 interface within an LTE/LTE-A wireless communication network technology to provide communication between base stations 105.

The network communications module 1340 may manage communications with the core network (e.g., core network 130-*a*), which may include communications via one or more wired backhaul links. For example, the network communications module 1340 may manage the transfer of data communications for client devices, such as one or more UEs 115.

Figure 14:
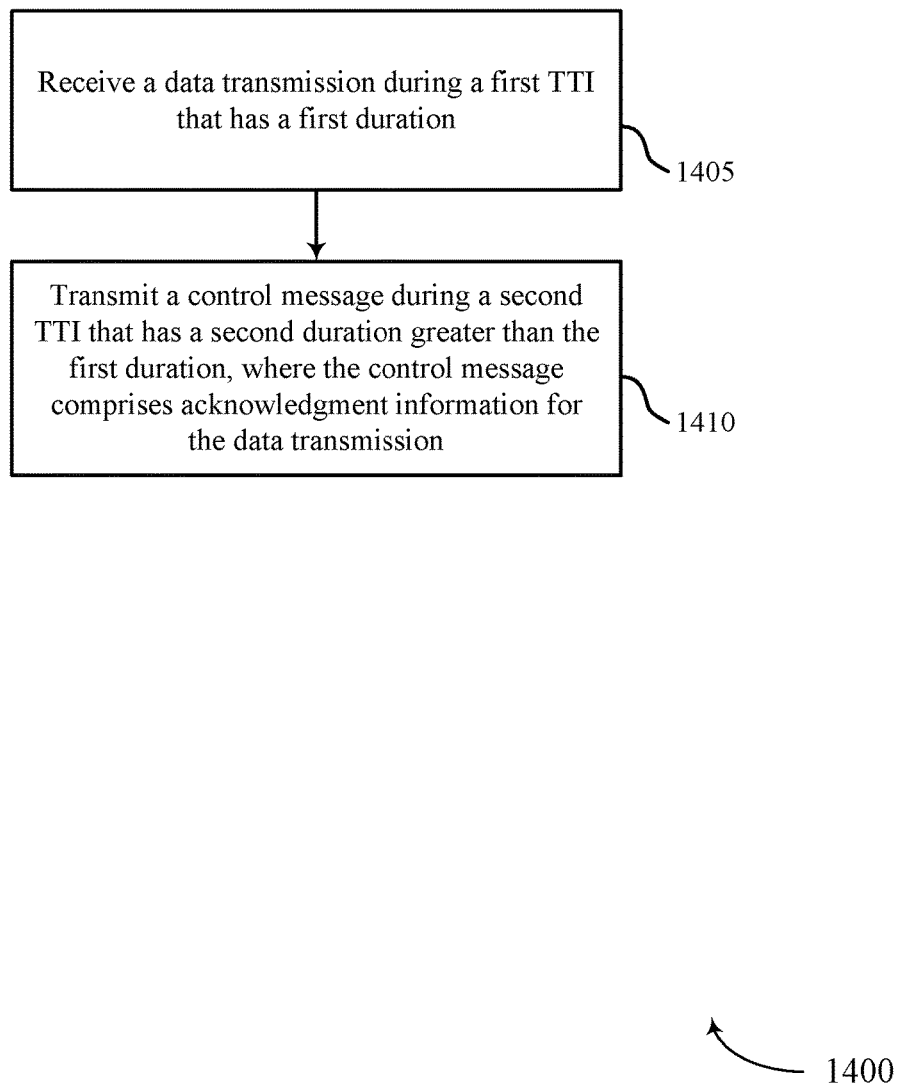
FIGS. 14 through 19 show flowcharts illustrating methods for employing one or more PUCCH configurations associated with low latency downlink communication, in accordance with aspects of the present disclosure.

FIG. 14 shows a flowchart illustrating a method 1400 for employing one or more PUCCH configurations associated with low latency downlink communication, in accordance with aspects of the present disclosure. The operations of method 1400 may be implemented by a UE 115 or its components as described with reference to FIG. 1, 2, 5, 9, or 13. For example, the operations of method 1400 may be performed by the PUCCH manager as described herein. In some examples, the UE 115 may execute a set of codes to control the functional elements of the device to perform the functions described below. Additionally or alternatively, the UE 115 may perform aspects the functions described below using special-purpose hardware.

At block 1405, the UE 115 may receive a data transmission during a first TTI that has a first duration, as described above with reference to FIGS. 1 through 5. Operations of block 1405 may be performed by a data component 715 or 805 as described with reference to FIG. 7 or 8, a receiver 605 or 705 described with references to FIG. 6 or 7, or transceiver(s) 925 as described with reference to FIG. 9.

At block 1410, the UE 115 may transmit a control message during a second TTI that has a second duration greater than the first duration, where the control message includes acknowledgment information for the data transmission, as described above with reference to FIGS. 1 through 5. Operations of block 1410 may be performed by a control message component 720 or 810 as described with reference to FIG. 7 or 8, a transmitter 615 or 725 described with references to FIG. 6 or 7, or transceiver(s) 925 as described with reference to FIG. 9.

Figure 15:
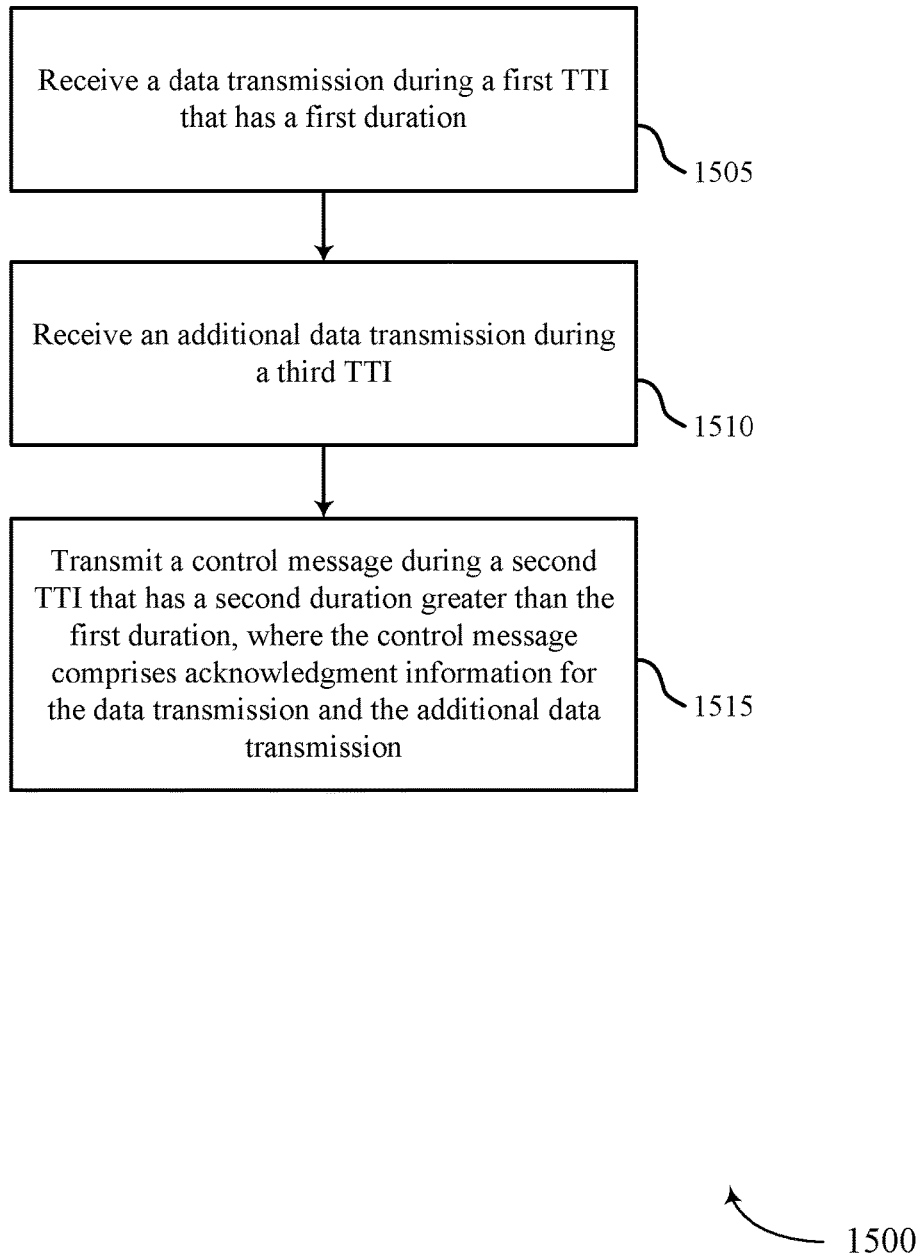

FIG. 15 shows a flowchart illustrating a method 1500 for employing one or more PUCCH configurations associated with low latency downlink communication in accordance with aspects of the present disclosure. The operations of method 1500 may be implemented by a UE 115 or its components as described with reference to FIG. 1, 2, 5, 9, or 13. For example, the operations of method 1500 may be performed by the PUCCH manager as described herein. In some examples, the UE 115 may execute a set of codes to control the functional elements of the device to perform the functions described below. Additionally or alternatively, the UE 115 may perform aspects the functions described below using special-purpose hardware.

At block 1505, the UE 115 may receive a data transmission during a first TTI that has a first duration, as described above with reference to FIGS. 1 through 5. Operations of block 1505 may be performed by a data component 715 or 805 as described with reference to FIG. 7 or 8, a receiver 605 or 705 described with references to FIG. 6 or 7, or transceiver(s) 925 as described with reference to FIG. 9.

At block 1510, the UE 115 may receive an additional data transmission during a third TTI, as described above with reference to FIGS. 1 through 5. Operations of block 1510 may be performed by a data component 715 or 805 as described with reference to FIG. 7 or 8, a receiver 605 or 705 described with references to FIG. 6 or 7, or transceiver(s) 925 as described with reference to FIG.

At block 1515, the UE 115 may transmit a control message during a second TTI that has a second duration greater than the first duration, where the control message includes acknowledgment information for the data transmission and the additional data transmission, as described above with reference to FIGS. 1 through 5. Operations of block 1515 may be performed by a control message component 720 or 810 as described with reference to FIG. 7 or 8, a transmitter 615 or 725 described with references to FIG. 6 or 7, or transceiver(s) 925 as described with reference to FIG. 9.

Figure 16:
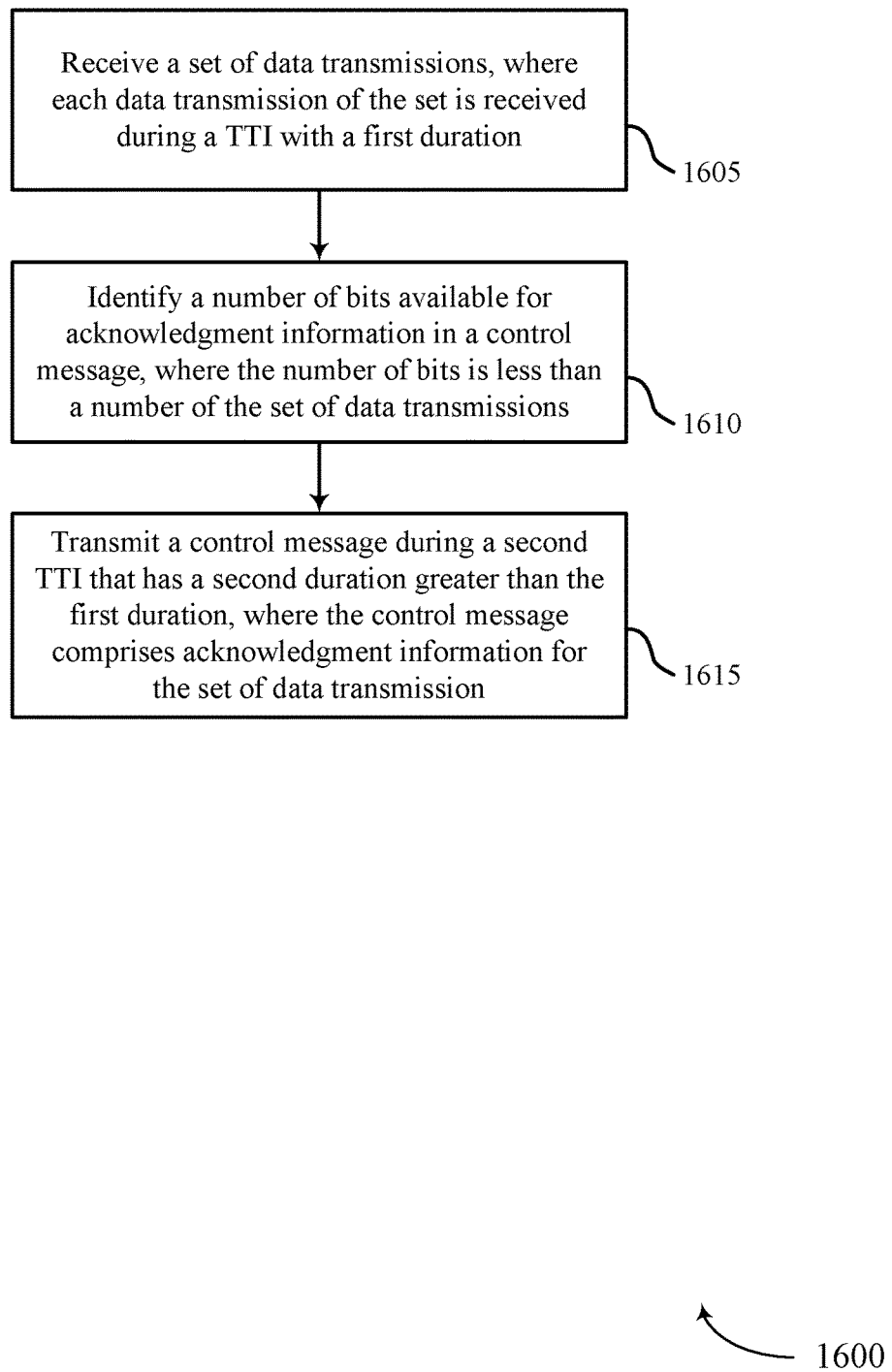

FIG. 16 shows a flowchart illustrating a method 1600 for employing one or more PUCCH configurations associated with low latency downlink communication, in accordance with aspects of the present disclosure. The operations of method 1600 may be implemented by a UE 115 or its components as described with reference to FIGS. 1, 2, 5, 9, and 13. For example, the operations of method 1600 may be performed by the PUCCH manager as described herein. In some examples, the UE 115 may execute a set of codes to control the functional elements of the device to perform the functions described below. Additionally or alternatively, the UE 115 may perform aspects the functions described below using special-purpose hardware.

At block 1605, the UE 115 may receive a set of data transmissions, where each data transmission of the set is received during a TTI with a first duration, as described above with reference to FIGS. 1 through 5. Operations of block 1605 may be performed by a data component 715 or 805 as described with reference to FIG. 7 or 8, a receiver 605 or 705 described with references to FIG. 6 or 7, or transceiver(s) 925 as described with reference to FIG. 9.

At block 1610, the UE 115 may identify a number of bits available for acknowledgment information in a control message, where the number of bits is less than a number of the set of data transmissions, as described above with reference to FIGS. 1 through 5. Operations of block 1610 may be performed by a compression component 815 as described with reference to FIG. 8.

At block 1615, the UE 115 may transmit the control message during a second TTI that has a second duration greater than the first duration, where the control message includes acknowledgment information for the set of data transmissions, as described above with reference to FIGS. 1 through 5. Operations of block 1615 may be performed by a control message component 720 or 810 as described with reference to FIG. 7 or 8, a transmitter 615 or 725 described with references to FIG. 6 or 7, or transceiver(s) 925 as described with reference to FIG. 9.

Figure 17:
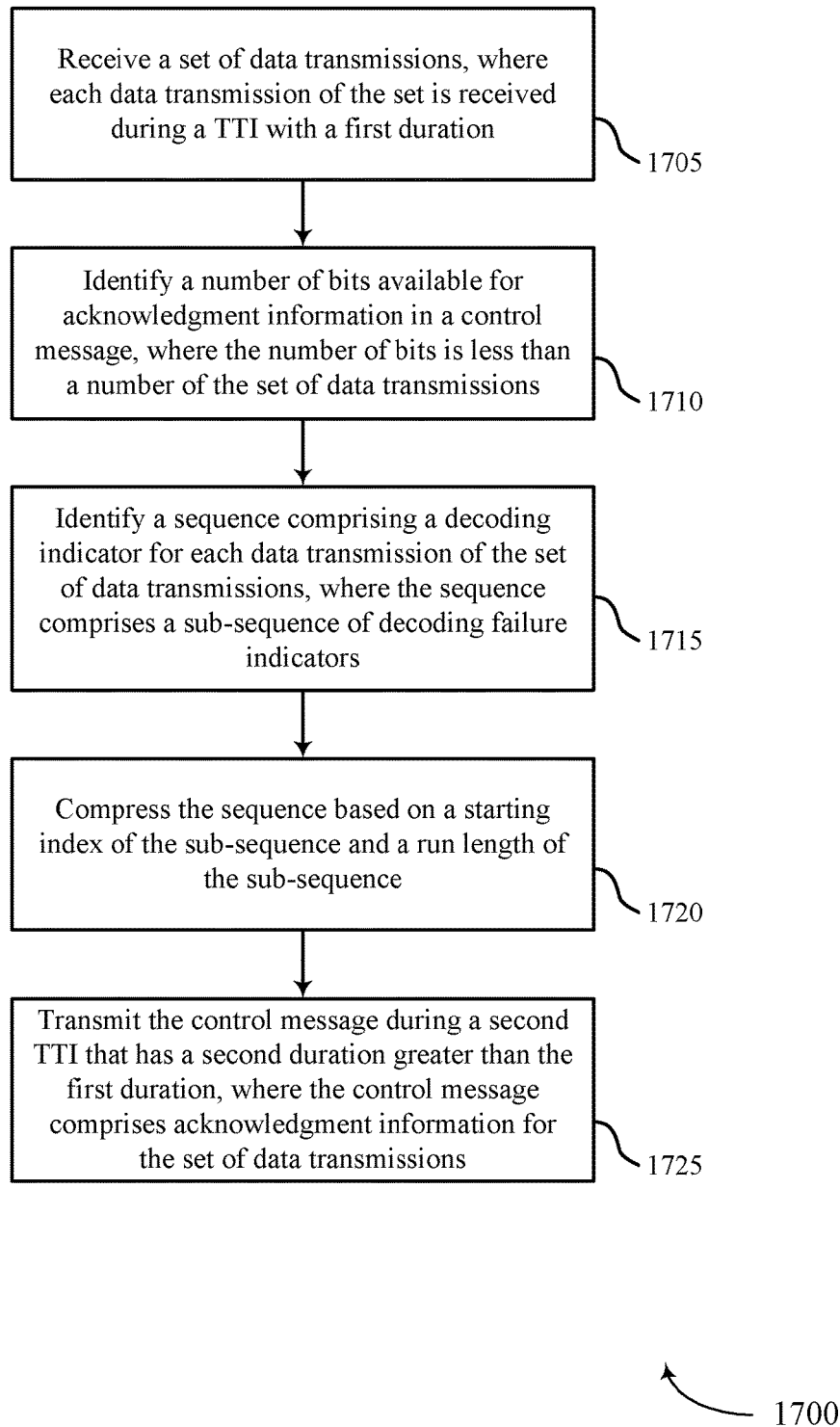

FIG. 17 shows a flowchart illustrating a method 1700 for employing one or more PUCCH configurations associated with low latency downlink communication, in accordance with aspects of the present disclosure. The operations of method 1700 may be implemented by a UE 115 or its components as described with reference to FIG. 1, 2, 5, 9, or 13. For example, the operations of method 1700 may be performed by the PUCCH manager as described herein. In some examples, the UE 115 may execute a set of codes to control the functional elements of the device to perform the functions described below. Additionally or alternatively, the UE 115 may perform aspects the functions described below using special-purpose hardware.

At block 1705, the UE 115 may receive a set of data transmissions, where each data transmission of the set is received during a TTI with a first duration, as described above with reference to FIGS. 1 through 5. Operations of block 1705 may be performed by a data component 715 or 805 as described with reference to FIG. 7 or 8, a receiver 605 or 705 described with references to FIG. 6 or 7, or transceiver(s) 925 as described with reference to FIG. 9.

At block 1710, the UE 115 may identify a number of bits available for acknowledgment information in a control message, where the number of bits is less than a number of the set of data transmissions, as described above with reference to FIGS. 1 through 5. Operations of block 1620 may be performed by a compression component 815 as described with reference to FIG. 8.

At block 1715, the UE 115 may identify a sequence including a decoding indicator for each data transmission of the set of data transmissions, where the sequence includes a sub-sequence of decoding failure indicators, as described above with reference to FIGS. 1 through 5. Operations of block 1715 may be performed by a compression component 815 as described with reference to FIG. 8.

At block 1720, the UE 115 may compress the sequence based on a starting index of the sub-sequence and a run length of the sub-sequence, as described above with reference to FIGS. 1 through 5. Operations of block 1720 may be performed by a compression component 815 as described with reference to FIG. 8.

At block 1725, the UE 115 may transmit the control message during a second TTI that has a second duration greater than the first duration, where the control message includes acknowledgment information for the set of data transmissions as described above with reference to FIGS. 1 through 5. Operations of block 1725 may be performed by a control message component 720 or 810 as described with reference to FIG. 7 or 8, a transmitter 615 or 725 described with references to FIG. 6 or 7, or transceiver(s) 925 as described with reference to FIG. 9.

Figure 18:
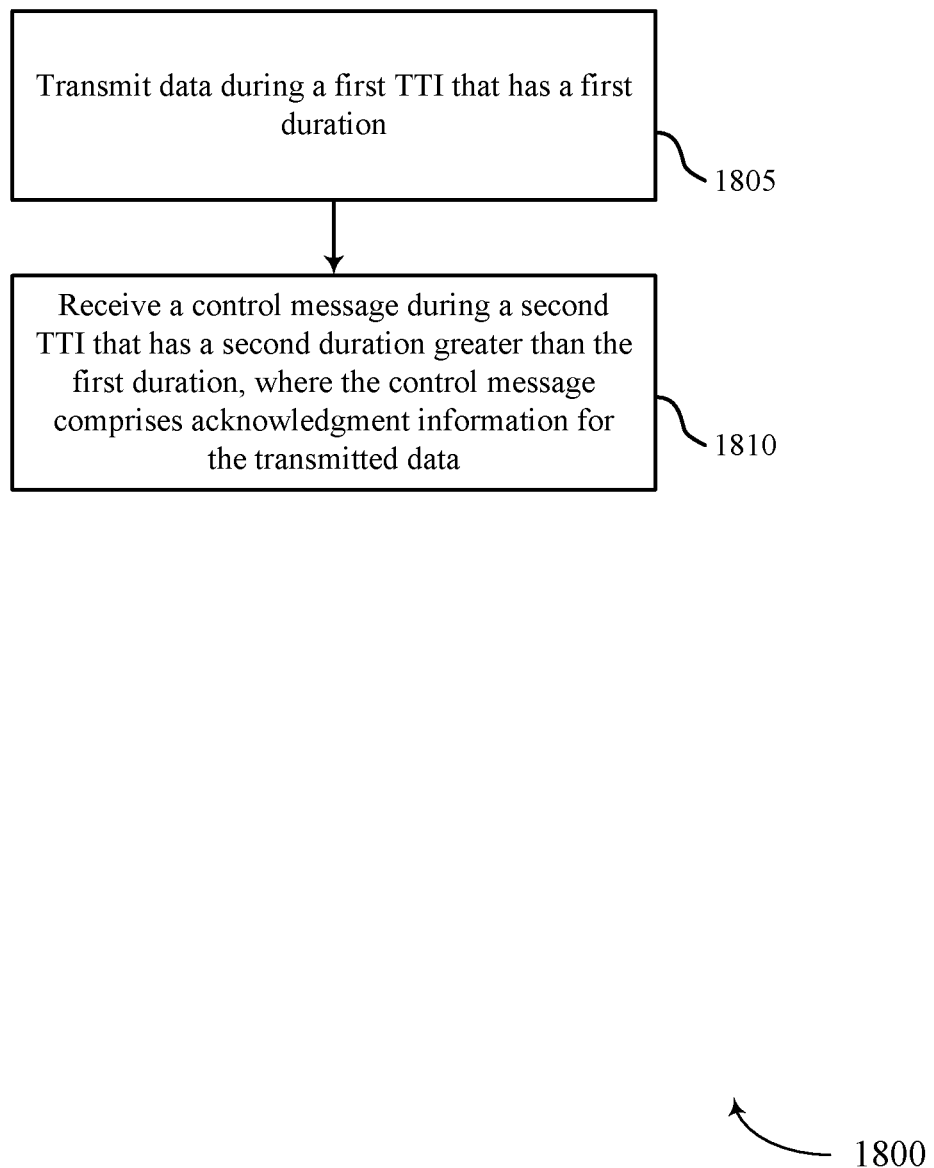

FIG. 18 shows a flowchart illustrating a method 1800 for employing one or more PUCCH configurations associated with low latency downlink communication, in accordance with aspects of the present disclosure. The operations of method 1800 may be implemented by a base station 105 or its components as described with reference to FIG. 1, 2, 5, 9, or 13. For example, the operations of method 1800 may be performed by the base station PUCCH manager as described herein. In some examples, the base station 105 may execute a set of codes to control the functional elements of the device to perform the functions described below. Additionally or alternatively, the base station 105 may perform aspects the functions described below using special-purpose hardware.

At block 1805, the base station 105 may transmit data during a first TTI that has a first duration, as described above with reference to FIGS. 1 through 5. Operations of block 1805 may be performed by a base station data component 1115 or 1205 as described with reference to FIG. 11 or 12, a transmitter 1015 or 1125 as described with reference to FIG. 10 or 11, or transceiver(s) 1325 as described with reference to FIG. 13.

At block 1810, the base station 105 may receive a control message during a second TTI that has a second duration greater than the first duration, where the control message includes acknowledgment information for the transmitted data, as described above with reference to FIGS. 1 through 5. Operations of block 1810 may be performed by a base station control message component 1120 or 1210 as described with reference to FIG. 11 or 12, a receiver 1105 or 1205 as described with reference to FIG. 11 or 12, or transceiver(s) 1325 as described with reference to FIG. 13.

Figure 19:
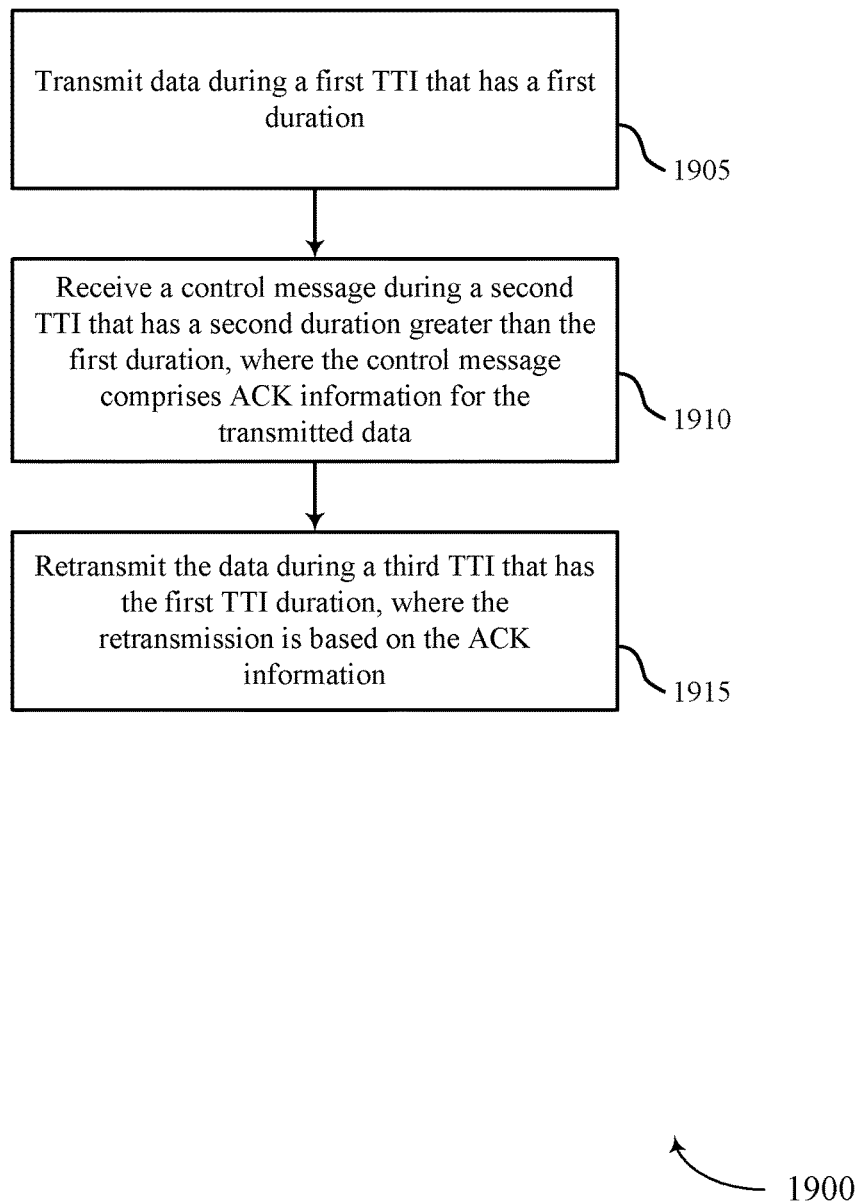

FIG. 19 shows a flowchart illustrating a method 1900 for employing one or more PUCCH configurations associated with low latency downlink communication, in accordance with aspects of the present disclosure. The operations of method 1900 may be implemented by a base station 105 or its components as described with reference to FIG. 1, 2, 5, 9, or 13. For example, the operations of method 1900 may be performed by the base station PUCCH manager as described herein. In some examples, the base station 105 may execute a set of codes to control the functional elements of the device to perform the functions described below. Additionally or alternatively, the base station 105 may perform aspects the functions described below using special-purpose hardware.

At block 1905, the base station 105 may transmit data during a first TTI that has a first duration, as described above with reference to FIGS. 1 through 5. Operations of block 1905 may be performed by a base station data component 1115 or 1205 as described with reference to FIG. 11 or 12, a transmitter 1015 or 1125 as described with reference to FIG. 10 or 11, or transceiver(s) 1325 as described with reference to FIG. 13.

At block 1910, the base station 105 may receive a control message during a second TTI that has a second duration greater than the first duration, where the control message includes acknowledgment information for the transmitted data, as described above with reference to FIGS. 1 through 5. Operations of block 1910 may be performed by a base station control message component 1120 or 1210 as described with reference to FIG. 11 or 12, a receiver 1105 or 1205 as described with reference to FIG. 11 or 12, or transceiver(s) 1325 as described with reference to FIG. 13.

At block 1915, the base station 105 may retransmit the data during a third TTI that has the first duration, where the retransmission based on the acknowledgment information, as described above with reference to FIGS. 1 through 5. Operations of block 1915 may be performed by the data retransmitting component 1215 as described with reference to FIG. 12, a transmitter 1015 or 1125 as described with reference to FIG. 10 or 11, or transceiver(s) 1325 as described with reference to FIG. 13.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for non-low latency PUCCH for low latency downlink communication.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), Institute of Electrical and Electronics Engineers (IEEE) 802.11 (wireless fidelity (Wi-Fi)), IEEE 802.16 (WiMAX), IEEE 802.20, Flash-O, Frequency division multiplexing (FDM), etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term eNB may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base station of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for non-low latency PUCCH for low latency downlink communication. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication comprising:
receiving a data transmission during a first transmission time interval (TTI) that has a first duration;
receiving an additional data transmission during a second TTI that has a second duration; and
transmitting, during a third TTI that has a duration greater than the first duration, a control message comprising acknowledgment information for the data transmission and acknowledgment information for the additional data transmission, wherein the control message comprises a first field that corresponds to data transmissions during TTIs with the first duration and a second field that corresponds to data transmissions during TTIs with the second duration, and wherein a sum of a first number of bits for the first field and a second number of bits for the second field represents a total number of bits available for the acknowledgment information in the control message.

2. The method of claim 1, wherein the third TTI has the second duration.

3. The method of claim 1, further comprising:
receiving a plurality of data transmissions, wherein each data transmission of the plurality is received during a TTI with the first duration,
and wherein the first number of bits for the first field is less than a number of the plurality of data transmissions.

4. The method of claim 3, further comprising:
identifying a sequence comprising a decoding indicator for each data transmission of the plurality of data transmissions, wherein the sequence comprises a sub-sequence of decoding failure indicators; and
compressing the sequence based at least in part on a starting index of the sub-sequence and a run length of the sub-sequence.

5. The method of claim 4, wherein the control message comprises an indicator of the starting index of the sub-sequence and an indicator of the run length of the sub-sequence.

6. The method of claim 4, wherein the control message comprises an indicator of the run length of the sub-sequence, and wherein the starting index of the sub-sequence corresponds to a location of a downlink control message.

7. The method of claim 1, further comprising:
receiving a downlink control message during a fourth TTI that has the first duration; and
identifying the third TTI for transmission of the control message based at least in part on the downlink control message.

8. The method of claim 1, further comprising:
identifying the third TTI for transmission of the control message based at least in part on a radio resource control (RRC) configuration.

9. The method of claim 1, further comprising:
identifying the third TTI for transmission of the control message based at least in part on a channel condition.

10. An apparatus for wireless communication, comprising:
a processor;
memory in electronic communication with the processor; and
instructions stored in the memory and executable by the processor to cause the apparatus to:
receive a data transmission during a first transmission time interval (TTI) that has a first duration;
receive an additional data transmission during a second TTI that has a second duration; and
transmit, during a third TTI that has a duration greater than the first duration, a control message comprising acknowledgment information for the data transmission and acknowledgment information for the additional data transmission, wherein the control message comprises a first field that corresponds to data transmissions during TTIs with the first duration and a second field that corresponds to data transmissions during TTIs with the second duration, and wherein a sum of a first number of bits for the first field and second number of bits for the second field represents a total number of bits available for the acknowledgment information in the control message.

11. The apparatus of claim 10, wherein the third TTI has the second duration.

12. The apparatus of claim 10, wherein the instructions are further executable by the processor to cause the apparatus to:
receive a plurality of data transmissions, wherein each data transmission of the plurality is received during a TTI with the first duration,
and wherein the first number of bits for the first field is less than a number of the plurality of data transmissions.

13. The apparatus of claim 12, wherein the instructions are further executable by the processor to cause the apparatus to:
identify a sequence comprising a decoding indicator for each data transmission of the plurality of data transmissions, wherein the sequence comprises a sub-sequence of decoding failure indicators; and
compress the sequence based at least in part on a starting index of the sub-sequence and a run length of the sub-sequence.

14. The apparatus of claim 13, wherein the control message comprises an indicator of the starting index of the sub-sequence and an indicator of the run length of the sub-sequence.

15. The apparatus of claim 13, wherein the control message comprises an indicator of the run length of the sub-sequence, and wherein the starting index of the sub-sequence corresponds to a location of a downlink control message.

16. The apparatus of claim 10, wherein the instructions are further executable by the processor to cause the apparatus to:
receive a downlink control message during a fourth TTI that has the first duration; and
identify the third TTI for transmission of the control message based at least in part on the downlink control message.

17. The apparatus of claim 10, wherein the instructions are further executable by the processor to cause the apparatus to:
identify the third TTI for transmission of the control message based at least in part on a radio resource control (RRC) configuration.

18. The apparatus of claim 10, wherein the instructions are further executable by the processor to cause the apparatus to:
identify the third TTI for transmission of the control message based at least in part on a channel condition.

19. An apparatus for wireless communication comprising:
means for receiving a data transmission during a first transmission time interval (TTI) that has a first duration;
means for receiving an additional data transmission during a second TTI that has a second duration; and
means for transmitting, during a third TTI that has a duration greater than the first duration, a control message comprising acknowledgment information for the data transmission and acknowledgment information for the additional data transmission, wherein the control message comprises a first field that corresponds to data transmissions during TTIs with the first duration and a second field that corresponds to data transmissions during TTIs with the second duration, and wherein a sum of a first number of bits for the first field and second number of bits for the second field represents a total number of bits available for the acknowledgment information in the control message.

20. The apparatus of claim 19, further comprising:
means for receiving a plurality of data transmissions, wherein each data transmission of the plurality is received during a TTI with the first duration,
and wherein the first number of bits for the first field is less than a number of the plurality of data transmissions.

21. The apparatus of claim 20, further comprising:
means for identifying a sequence comprising a decoding indicator for each data transmission of the plurality of data transmissions, wherein the sequence comprises a sub-sequence of decoding failure indicators; and
means for compressing the sequence based at least in part on a starting index of the sub-sequence and a run length of the sub-sequence.

22. The apparatus of claim 21, wherein the control message comprises an indicator of the starting index of the sub-sequence and an indicator of the run length of the sub-sequence.

23. The apparatus of claim 21, wherein the control message comprises an indicator of the run length of the sub-sequence, and wherein the starting index of the sub-sequence corresponds to a location of a downlink control message.

24. The apparatus of claim 19, wherein the third TTI has the second duration.

25. The apparatus of claim 19, further comprising:
means for receiving a downlink control message during a fourth TTI that has the first duration; and
means for identifying the third TTI for transmission of the control message based at least in part on the downlink control message.

26. The apparatus of claim 19, further comprising:
identifying the third TTI for transmission of the control message based at least in part on a radio resource control (RRC) configuration.

27. The apparatus of claim 19, further comprising:
means for identifying the third TTI for transmission of the control message based at least in part on a channel condition.

28. A non-transitory computer-readable medium storing code for wireless communication, the code comprising instructions executable to:
receive a data transmission during a first transmission time interval (TTI) that has a first duration;
receive an additional data transmission during a second TTI that has a second duration; and
transmit, during a third TTI that has a duration greater than the first duration, a control message comprising acknowledgment information for the data transmission and acknowledgment information for the additional data transmission, wherein the control message comprises a first field that corresponds to data transmissions during TTIs with the first duration and a second field that corresponds to data transmissions during TTIs with the second duration, and wherein a sum of a first number of bits for the first field and second number of bits for the second field represents a total number of bits available for the acknowledgment information in the control message.

29. The non-transitory computer-readable medium of claim 28, the code further comprising instructions executable to:
receive a plurality of data transmissions, wherein each data transmission of the plurality is received during a TTI with the first duration, and wherein the first number of bits for the first field is less than a number of the plurality of data transmissions.

30. The non-transitory computer-readable medium of claim 29, the code further comprising instructions executable to:
identify a sequence comprising a decoding indicator for each data transmission of the plurality of data transmissions, wherein the sequence comprises a sub-sequence of decoding failure indicators; and
compress the sequence based at least in part on a starting index of the sub-sequence and a run length of the sub-sequence.

* * * * *